United States Patent
Long et al.

(10) Patent No.: US 9,274,352 B2
(45) Date of Patent: *Mar. 1, 2016

(54) ACTIVELY TUNABLE POLAR-DIELECTRIC OPTICAL DEVICES

(71) Applicants: James Peter Long, Accokeek, MD (US); Joshua D. Caldwell, Accokeek, MD (US); Jeffrey C. Owrutsky, Silver Spring, MD (US); Orest J. Glembocki, Alexandria, VA (US)

(72) Inventors: James Peter Long, Accokeek, MD (US); Joshua D. Caldwell, Accokeek, MD (US); Jeffrey C. Owrutsky, Silver Spring, MD (US); Orest J. Glembocki, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,738

(22) Filed: Oct. 24, 2014

(65) Prior Publication Data

US 2015/0063739 A1 Mar. 5, 2015

Related U.S. Application Data

(63) Continuation of application No. 14/174,927, filed on Feb. 7, 2014.

(60) Provisional application No. 61/775,837, filed on Mar. 11, 2013, provisional application No. 61/764,755, filed on Feb. 14, 2013.

(51) Int. Cl.
G01J 5/20 (2006.01)
G02F 1/01 (2006.01)
(Continued)

(52) U.S. Cl.
CPC ...... *G02F 1/01* (2013.01); *G01J 3/12* (2013.01); *G02B 26/02* (2013.01); *G02F 1/011* (2013.01);
(Continued)

(58) Field of Classification Search
CPC .. B82Y 20/00; G02B 6/1225; G02F 2202/32; G02F 2203/13
See application file for complete search history.

(56) References Cited

U.S. PATENT DOCUMENTS

2003/0039446 A1* 2/2003 Hutchinson et al. ............ 385/39
2008/0159679 A1* 7/2008 Sigalas et al. .................... 385/2
(Continued)

FOREIGN PATENT DOCUMENTS

EP 0390651 B1 5/1996
JP 2009200461 A 9/2009
(Continued)

OTHER PUBLICATIONS

"Optical antenna thermal emitters", Nature Photonics, Oct. 19, 2009, pp. 658-661 to Schuller et al.*
(Continued)

*Primary Examiner* — David J Makiya
*Assistant Examiner* — Kenneth J Malkowski
(74) *Attorney, Agent, or Firm* — US Naval Research Laboratory; Joslyn Barritt

(57) ABSTRACT

Optical devices that include one or more structures fabricated from polar-dielectric materials that exhibit surface phonon polaritons (SPhPs), where the SPhPs alter the optical properties of the structure. The optical properties lent to these structures by the SPhPs are altered by introducing charge carriers directly into the structures. The carriers can be introduced into these structures, and the carrier concentration thereby controlled, through optical pumping or the application of an appropriate electrical bias.

30 Claims, 19 Drawing Sheets

(51) Int. Cl.
    G02B 26/02    (2006.01)
    G01J 3/12     (2006.01)
    B82Y 20/00    (2011.01)
(52) U.S. Cl.
    CPC ............... *G02F 1/0126* (2013.01); *B82Y 20/00* (2013.01); *G01J 2003/1213* (2013.01); *G02F 2202/10* (2013.01); *G02F 2203/10* (2013.01); *Y10S 977/932* (2013.01)

(56) References Cited

U.S. PATENT DOCUMENTS

| | | | |
|---|---|---|---|
| 2010/0314723 | A1 | 12/2010 | Schmidt et al. |
| 2011/0026874 | A1 | 2/2011 | Bowers et al. |
| 2011/0068320 | A1 | 3/2011 | Marinero et al. |
| 2011/0091149 | A1 | 4/2011 | Jen et al. |
| 2011/0186437 | A1 | 8/2011 | Huang et al. |
| 2012/0057215 | A1 | 3/2012 | Suh et al. |
| 2012/0074323 | A1 | 3/2012 | Gomez Rivas et al. |
| 2013/0026382 | A1 | 1/2013 | Yao et al. |
| 2014/0175283 | A1* | 6/2014 | Vassant et al. ............. 250/338.4 |
| 2014/0191188 | A1* | 7/2014 | Vassant et al. ................. 257/13 |

FOREIGN PATENT DOCUMENTS

| | | | |
|---|---|---|---|
| KR | 1020120024030 A | | 3/2012 |
| WO | WO 2012110520 A1 | * | 8/2012 |
| WO | WO 2012110522 A1 | * | 8/2012 |

OTHER PUBLICATIONS

"Metamaterials", Center for Metamaterials and Integrated Plasmonics, available at http://metamaterials.duke.edu/research/metamaterials.*

Search Report and Written Opinion mailed Nov. 20, 2014 in corresponding application PCT/US2014/015202.

K.Y. Lau, N. Bar-Chaim, I. Ury, Ch. Harder, and A. Yariv, "Direct amplitude modulation of short-cavity GaAs lasers up to X-band frequencies," Appl. Phys. Lett, 43 (1) (1983).

Louay Eldada, "Optical communication components," Review Of Scientific Instruments, vol. 75, No. 3, pp. 575-593 (2004).

N.B. Singh, D. Kahler, D.J. Knuteson, M. Gottlieb, D. Suhre, A. Berghmans, B. Wagner, J. Hedrick, T. Karr, and J.J. Hawkins, "Operational characteristics of a long-wavelength IR multispectral imager based on an acousto-optic tunable filter," Opt. Engineering 2008, 47 (1), 013201.

R. Bukasov and J.S. Shumaker-Parry, "Silver nanocrescents with infrared plasmonic properties as tunable substrates for surface enhanced infrared absorption spectroscopy," Anal. Chem. 2009, 81, 4531-4535.

R.F. Aroca, D.J. Ross, and C. Domingo, "Surface-enhanced infrared spectroscopy," Appl. Spectrosc. 2004, 58, 324A-338A.

M.S. Anderson, "Enhanced Infrared Absorption with Dielectric Nanoparticles," Appl. Phys. Lett. 2003, 83 (14), 2964-2966.

Y.C Jun and I. Brener, "Electrically tunable infrared metamaterials based on depletion-type semiconductor devices" J. Opt. 2012, 14, 114013.

J.D. Caldwell, O.J. Glembocki, Y. Francescato, N. Sharac, V. Giannini, F. J. Bezares, J.P. Long, J.C. Owrutsky, I. Vurgaftman, J.G. Tischler, V. D. Wheeler, N.D. Bassim, L.M. Shirey, R. Kasica, and S.A. Maier, "Low-loss, extreme sub-diffraction photon confinement via silicon carbide localized surface phonon polariton resonators," Nano Lett. 2013, 13, 3690-3697.

A.V. Zayats, I.I. Smolyaninov, and A.A. Maradudin, "Nano-optics of surface plasmon polaritons," Physics Reports, 2005, 81, 131-314.

A. Alu and N. Engheta, "All optical metamaterial circuit board at the nanoscale," Phys. Rev. Lett. 2009, 103, 143902.

J.S. Schuller, T. Taubner, and M.L. Brongersma, "Optical antenna thermal emitters," Nature Photonics 2009, 3, 658-661.

S. Link and M. A. El-Sayed, "Shape and size dependence of radiative, non-radiative and photothermal properties of gold nanocrystals," Intl. Reviews Phys. Chem., 2000, 19, 409-453.

Search Report and Written Opinion in corresponding application PCT/US2014/015202.

Yongmin Liu and Xiang Zhang, "Metamaterials: a new frontier of science and technology," Chem. Soc. Rev., 2011, 40, 2494-2507.

\* cited by examiner

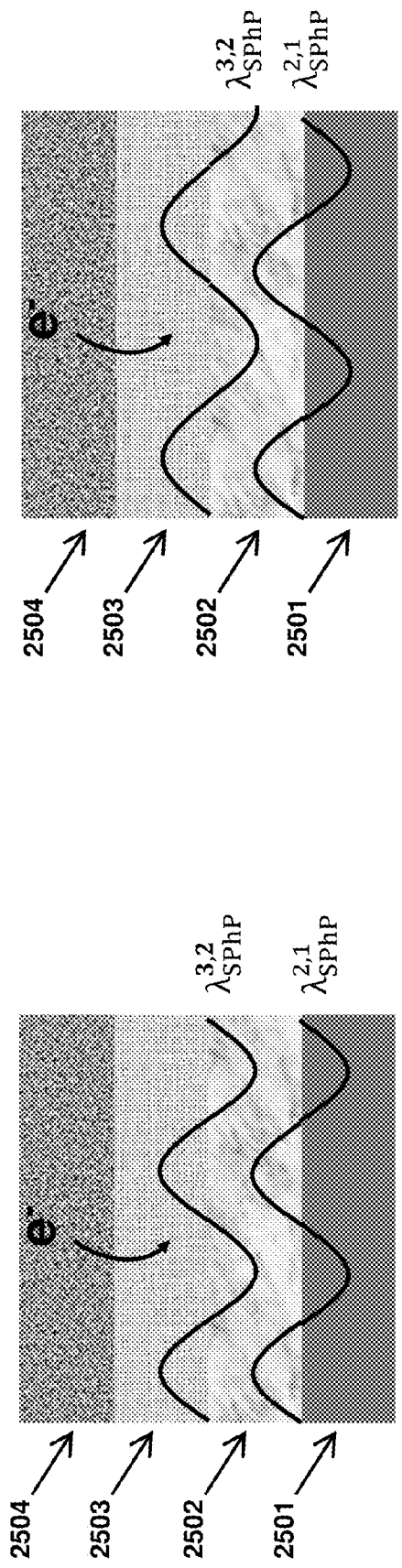
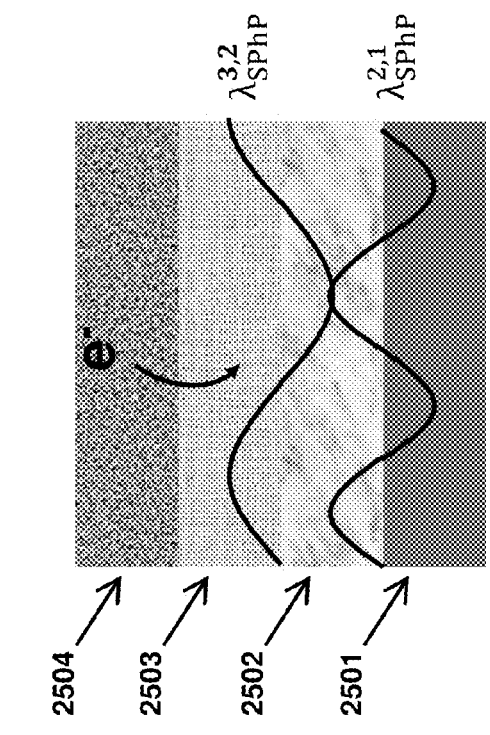
FIG. 25A
FIG. 25B
FIG. 25C

ACTIVELY TUNABLE POLAR-DIELECTRIC OPTICAL DEVICES

CROSS-REFERENCE

This application is a Continuation-in-part of, and claims the benefit of priority under 35 U.S.C. §120 based on, U.S. patent application Ser. No. 14/174,927 filed on Feb. 7, 2014, which in turn is a Nonprovisional of, and claims the benefit of priority under 35 U.S.C. §119 based on, U.S. Provisional Patent Application No. 61/754,755 filed on Feb. 14, 2013 and U.S. Provisional Patent Application No. 61/775,837 filed on Mar. 11, 2013, all of which are hereby incorporated by reference into the present application in their entirety.

TECHNICAL FIELD

The present invention relates to the field of optical devices, particularly devices that actively modulate the intensity or vary the wavelength of light using free carrier injection into the device.

BACKGROUND

The modulation of electromagnetic radiation is widely used, for example, to propagate signals carried at the modulation frequency, to improve signal-to-noise with phase-sensitive detection at the modulation frequency, or to switch light on and off. Many approaches well known in the art have been employed to effect the modulation without use of moving mechanical parts. These include electrical control of the radiation-source intensity itself, use of electro-optic materials to adjust the polarization orientation relative to the transmission axis of a polarizing filter, and use of Bragg diffraction at acoustic frequencies. See K. Y. Lau, N. Bar-Chaim, I. Ury, Ch. Harder, and A. Yariv, "Direct amplitude modulation of short-cavity GaAs lasers up to X-band frequencies," *Appl. Phys. Lett*, 43 (1) (1983); and Louay Eldada, "Optical communication components," *Review Of Scientific Instruments*, Vol. 75, No. 3, pp. 575-593 (2004). Modulating optical power by dynamically changing the reflectance or absorbance of a material has generally not been employed because of the difficulty of producing significant amplitude or frequency modulation.

A modulator exposed to broad-band illumination (e.g., white light) may also serve as a tunable source of radiation if it transmits or reflects a narrow band of wavelengths around a tunable center wavelength. This can be accomplished with commercial liquid-crystal tunable filters, but such filters have limited operation speeds (ms) and do not function in the mid- or far-IR spectral range. Other specialized acousto-optic tunable filters may operate in the IR, but require light to pass through bulky crystals and require substantial driving power. See N. B. Singh, D. Kahler, D. J. Knuteson, M. Gottlieb, D. Suhre, A. Berghmans, B. Wagner, J. Hedrick, T. Karr, and J. J. Hawkins, "Operational characteristics of a long-wavelength IR multispectral imager based on an acousto-optic tunable filter," *Opt. Engineering* 2008, 47 (1), 013201.

When acting as a tunable source, a modulator can be used in molecular sensing applications if its wavelength can be tuned to optical absorptions characteristic of the analyte (i.e., the chemical of interest), as in optical absorption spectroscopy and infrared absorption spectroscopy (IRAS). Fieldable or remote sensing IRAS spectrometers, of particular interest to the DoD, but also of general commercial interest, are hampered by the paucity and small tuning range of available sources as well as their size, weight and power requirements.

Another sensor approach is based on surface-enhanced infrared absorption (SEIRA), where the detection of vibrational "fingerprints" of molecules adsorbed on the antenna is enhanced by the strong local optical fields near a rough or nanostructured surface, which could be a tunable nanoantenna. See R. Bukasov and J. S. Shumaker-Parry, "Silver nanocrescents with infrared plasmonic properties as tunable substrates for surface enhanced infrared absorption spectroscopy," *Anal. Chem.* 2009, 81, 4531-4535; R. F. Aroca, D. J. Ross, and C. Domingo, "Surface-enhanced infrared spectroscopy," *Appl. Spectrosc.* 2004, 58, 324A-338A; and M. S. Anderson, "Enhanced Infrared Absorption with Dielectric Nanoparticles," *Appl. Phys. Lett.* 2003, 83 (14), 2964-2966.

Recently, miniaturization has been pursued for optical functions through the use of highly confined optical modes, which have potential to improve the performance and reduce the size and power requirements of optical modulators and sensors. For example, in sensing applications based on nanoantennas (e.g., SEIRA-based sensors), extreme miniaturization of the antenna is desirable both to increase the relative response of an individual antenna, and to increase the surface area for enhanced response-per-unit-area of the sensor platform.

Presently, highly confined optical modes are realized with surface-plasmons in metal nanostructures and waveguides. However, because plasmonic systems rely on free charge-carriers moving in response to optical fields (e.g., optical conduction currents in a metal), they suffer inherently from large scattering and absorption losses in the charge-carrier ensemble.

An alternative lower-loss approach, central to our disclosure, uses the vibrational motion of charge bound to the positive and negative atomic or molecular ions comprising a polar-dielectric (e.g., SiC, GaN, etc.) lattice. Charge bound to the positive and negative ions comprising a polar-dielectric (e.g., SiC, GaN, etc.) lattice will undergo a vibrational motion when stimulated by an outside force. This vibrational motion of atoms in the lattice is known as a "phonon," while the coherent oscillatory motion of the charge carriers (i.e., of the free-electron or free-hole gas) is known as a "plasmon." Each of these oscillatory motions has an associated wavelength, where $\lambda_{plasmon}$ is the wavelength corresponding to the characteristic plasmon frequency of a material ("plasmonic material") such as a metal or a doped semiconductor and $\lambda_{TO}$ and $\lambda_{LO}$ are the wavelengths associated with the transverse and longitudinal optical phonon vibrational frequencies, respectively.

In certain material-dependent wavelength ranges near the so-called "Reststrahlen" band, these polar-lattice vibrations in these materials interact with light to produce surface phonon polaritons (SPhPs), which cause the optical response of the material (referred to herein as a "SPhP material") to be similar to that of a metal, albeit without the presence of free carriers and the associated electrical conductivity and optical losses (due to fast carrier scattering rates). For both plasmonic and SPhP materials, the real part $\in_1(\lambda)$ of the complex dielectric function—the physical parameter governing the optical response—assumes negative values for certain wavelengths $\lambda$, lending high reflectance to metals when $\lambda \geq \lambda_{plasmon}$ and to SPhP materials when $\lambda_{TO} \geq \lambda \geq \lambda_{LO}$.

Negative values of $\in_1(\lambda)$ permit resonant antennas to be constructed that are much smaller than their resonant wavelength, through what is sometimes called a Frolich, or dipole mode. Such plasmonic antennas are referred to as local surface-plasmon resonators (LSPRs); here we refer to the surface phonon-polariton analog as a local surface-phonon resonator, and such an antenna is an "LSPhP" resonant antenna.

This class of antenna resonates at a wavelength $\lambda_{res}$ when $\in_1(\lambda_{res})$ assumes a specific value that depends on the geometric shape of the antenna. A well-known geometry is the sphere, which resonates when $$\in_1(\lambda_{res}) = -2\in_a, \tag{1}$$

where $\in_a$ is the dielectric constant of the ambient material surrounding the sphere, with $\in_a=1$ for an LSPhP resonator in air. Notably, principles of electromagnetism do not impose any lower limit to the size of these antennas because their resonant wavelength is set only by geometric shape. This is a unique distinction with the more common half-wave antennas and their kin, the size of which bears a fixed relationship to the resonant wavelength.

However, plasmonic antennas made of metals exhibit high losses. As a result, their resonant wavelengths have a broad spectral width which makes them less effective for applications requiring a strong response over a narrow wavelength band, such as thermal or quantum emitters or wavelength filters. Another shortcoming of plasmonic antennas made of metal is that their resonance wavelength cannot be dynamically tuned because the conduction electron density of a metal, which determines $\in_1(\lambda)$ and hence the resonant frequency, is large and difficult to modify via traditional means (e.g., by electrostatic gating or optical pumping).

Although a plasmonic antenna made of metal can be tuned by altering the dielectric function of the nearby environment through the introduction of charge carriers, the benefits of large tuning ranges and narrow resonances in the infrared are not likely to be obtained. See Y. C Jun and I. Brener, "Electrically tunable infrared metamaterials based on depletion-type semiconductor devices" *J. Opt.* 2012, 14, 114013. Similarly, alterations in the nearby dielectric environment can be induced through electro-optic means, but again, tuning ranges will be severely limited. In principle, plasmonic antennas could also be constructed of semiconductors in which free carriers are introduced dynamically through electrical injection or optical pumping, see U.S. Patent Application Publication No. 2012/0074323 by J. Gomez rivas, V. Giannini, A. Berrier, S. A. Maier, M. Matters-Kammerer, and L. Tripodi, "THz frequency range antenna" (Mar. 29, 2012), but the density required to produce a Frolich resonance in the wavelength range of interest is prohibitively large and deleteriously lossy, where the losses result in resonance bands that are broad compared to the tuning range, which limits modulation depth.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides optical devices that include one or more structures fabricated from polar-dielectric materials that exhibit surface phonon polaritons (SPhPs). In accordance with the present invention, an incoming optical beam to be modulated is configured to include wavelengths within the Reststrahlen band of the polar-dielectric material, where the Reststrahlen band wavelengths cause the material to exhibit SPhPs which in turn affect the optical properties of the material. These optical properties are dependent on N, the concentration of charge carriers in the material, so can be changed by altering the concentration of charge carriers in the material. Thus, in accordance with the present invention, the optical response of a polar-dielectric material to an optical beam having wavelengths within the material's Reststrahlen band can be selectively tuned by directly injecting charge carriers into the material.

In some embodiments, the charge carrier concentration in the device is optically pumped, wherein additional charge carriers are injected into the material by means of an optical pump beam directed at the material, while in other embodiments the concentration in the device is electrically pumped, wherein the charge carriers are injected into the material by means of a voltage source coupled to the device. Thus, devices in accordance with the present invention modulate the intensity or the wavelength of infrared radiation (i.e., wavelengths between the visible and microwave regions for which polar-dielectrics support Reststrahlen bands) through the modulation of an applied optical or electrical drive signal.

In some embodiments, a polar-dielectric device in accordance with the present invention includes one or more SPhP resonant nanoantennas. In such a device, the resonant wavelength $\lambda_{res}$ of the antennas can be selectively tuned by optically or electrically varying the concentration of charge carriers in the nanoantennas.

In some embodiments, such an SPhP resonant nanoantenna device is configured to act as a tunable filter, where a beam of broad-band radiation is converted into a desired narrow-band beam. In other embodiments, an SPhP resonant nanoantenna device in accordance with the present invention can be configured to modulate the amplitude and/or phase of light reflected and/or transmitted from the device or to turn the reflected and/or transmitted light on and off at very high speeds. In other embodiments, an SPhP resonant nanoantenna device in accordance with the present invention can be configured whereby a thermal emission spectrum from the SPhP resonant nanoantennas is modified via the injection of charge carriers into the polar-dielectric material.

In some embodiments, such an SPhP resonant nanoantenna device is configured as a sensor where the reflected and/or transmitted beam produced by an incoming probe beam can be selectively configured to detect and identify one or more specific molecules through their characteristic vibrational spectra.

In other embodiments, the SPhP polar-dielectric material in a device in accordance with the present invention can be configured as a waveguide, where the index of refraction $n_r$ of the device can be selectively tuned by optically or electrically varying the concentration of charge carriers in the polar-dielectric material.

In some embodiments, an SPhP polar-dielectric waveguide device in accordance with the present invention can be configured to steer an incoming light beam and cause it to travel in a desired direction.

In some embodiments, an SPhP polar-dielectric waveguide device in accordance with the present invention can be configured to modulate an incoming optical beam to produce an output beam having a desired amplitude, wavelength, and/or phase or to turn the beam on and off at very high speeds.

In some embodiments, an SPhP polar-dielectric waveguide can be combined with one or more SPhP resonant nanoantennas to form, e.g., a molecular sensor.

In some embodiments, a device in accordance with the present invention can be configured with multiple SPhP materials whereby a multifrequency structure can be created, with layer selective carrier injection possible based on the various band gaps of the constituent materials.

In still other embodiments, a device in accordance with the present invention can be configured whereby a metamaterial fabricated in whole or in part from SPhP materials, could exhibit carrier-induced modifications to its optical response.

In addition to the devices described herein, the present invention also provides methods for modulating an incoming infrared beam onto a device by selectively modifying the charge carrier density in polar-dielectric features of the device to produce an output beam having desired resonant wavelength, amplitude, phase or polarization characteristics or for turning the output beam on and off at a high rate of speed.

Thus, in accordance with the present invention, an incoming beam incident on a polar-dielectric structure can be actively modulated by directly injecting charge carriers N into the polar-dielectric material through either an optical pump beam or a voltage source. Such changes in carrier density alter the resonant wavelength $\lambda_{res}$ of polar-dielectric local SPhP (LSPhP) resonant antennas and/or the refractive index $n_r(N, \lambda)$ of a polar-dielectric SPhP waveguide, or an epsilon-near-zero (ENZ) waveguide in the device.

BRIEF DESCRIPTION OF THE DRAWINGS

FIGS. 25A-25C are block diagrams illustrating possible behaviors of interface polaritons ($\lambda_{SPhP}$) between layers in a waveguide formed from multiple SPhP materials in accordance with one or more aspects of the present invention.

DETAILED DESCRIPTION

Figure 1:
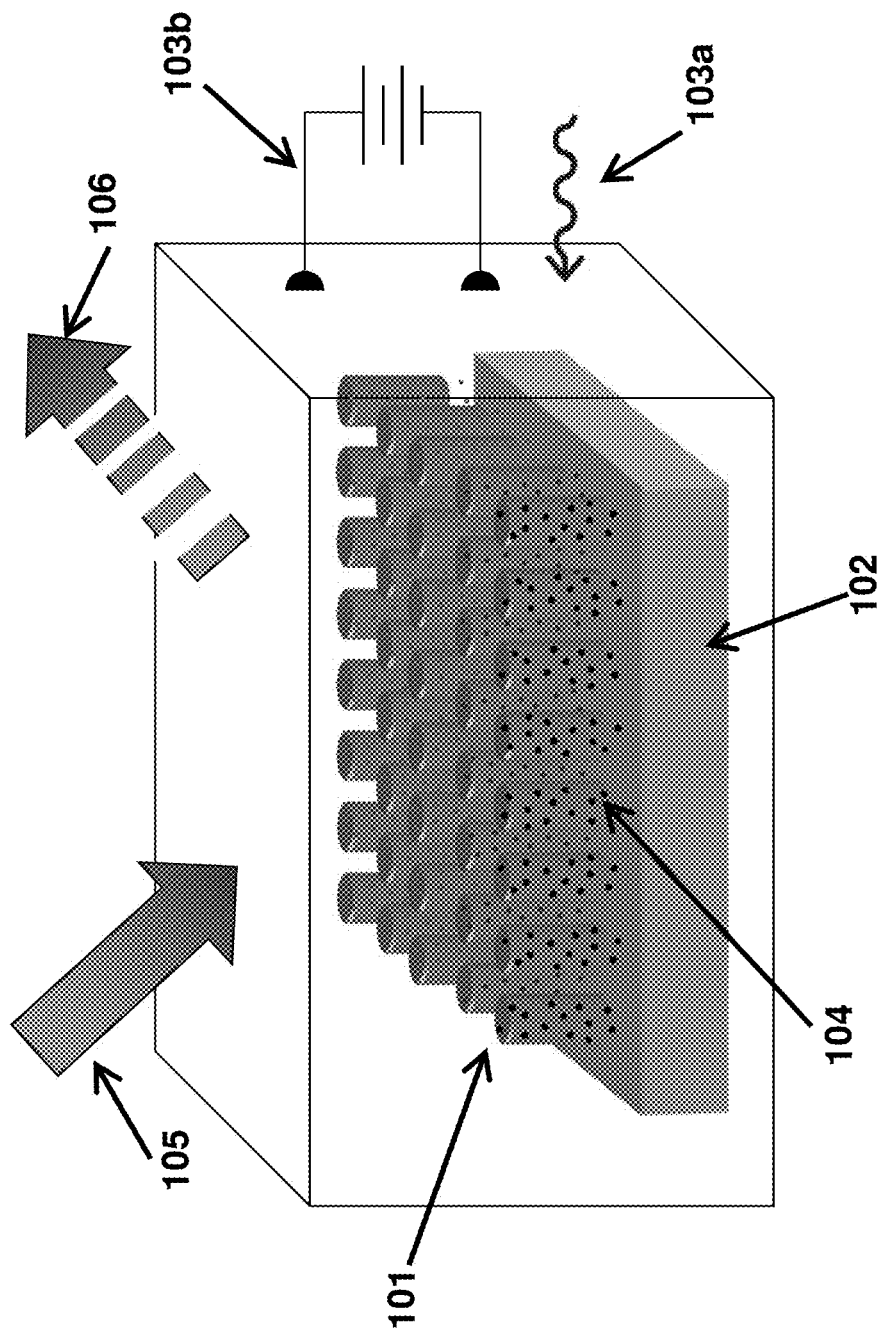
FIG. 1 is a block diagram illustrating general aspects of an actively tunable polar-dielectric optical device in accordance with the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The invention provides devices that actively tune the reflection, transmission, or absorption of light directed at functional structures fabricated from polar-dielectrics that support surface phonon polaritons (SPhPs), where "tuning" as used herein includes the selective modification of one or more characteristics of the light, such as its wavelength, phase, or amplitude.

In accordance with the present invention, the optical properties lent to specific structures by the SPhPs are altered by introducing charge carriers directly into the structures. The carriers can be introduced into these structures, and the carrier concentration thereby controlled, either through electrical bias or optical pumping. These devices leverage the unique sensitivity of the optical properties of polar-dielectrics to modest charge-carrier densities when the optical wavelength is near the so-called Reststrahlen band of the material, where the optical properties are dominated by the SPhPs. The structures of interest include but are not limited to optical nanoantennas that resonate in the infrared and waveguides for infrared light, where the term "infrared" as used herein would be understood by those skilled in the art to include wavelengths in the mid-infrared, far-infrared, and THz range, that is, wavelengths between the visible and microwave regions for which polar-dielectrics support Reststrahlen bands.

Devices in accordance with the present invention employ a new method to effect intensity and wavelength modulation by combining two phenomena specific to wavelengths near the "Reststrahlen band" of the polar-dielectric-materials employed. The first is the metallic-like optical behavior in this wavelength range, which allows the construction of nano- and micro-scale optical resonators far smaller than the wavelength, and with a resonant frequency that can be coarsely tuned with shape. See e.g., J. D. Caldwell, O. J. Glembocki, Y. Francescato, N. Sharac, V. Giannini, F. J. Bezares, J. P. Long, J. C. Owrutsky, I. Vurgaftman, J. G. Tischler, V. D. Wheeler, N. D. Bassim, L. M. Shirey, R. Kasica, and S. A. Maier, "Low-loss, extreme sub-diffraction photon confinement via silicon carbide localized surface phonon polariton resonators," *Nano Lett.* 2013, 13, 3690-3697. The second is the especially strong optical response of the dielectric in this wavelength range to the presence of charge carriers within it, which enables the ability to finely tune the optical response of the SPhP material over a broad range with the internal charge-carrier density.

The underlying optical properties of SPhPs, namely low loss, strong dispersion of the dielectric function, and sensitivity to carrier concentration, provide the invention with advantages of unprecedented tuning range and high quality-factors at wavelengths between the mid-infrared and single-digit THz compared to methods or devices based on carrier-induced perturbations to the environment of metallic plasmonic antennas or to the carrier plasmon frequency in semiconductors. These optical properties are altered by introducing charge carriers directly into the structures. The carriers can be introduced into these structures, and the carrier concentration thereby controlled, through optical pumping or the application of an appropriate electrical bias.

Thus, in accordance with the present invention, these principles are utilized to provide infrared optical modulators. The incoming beam to be modulated will be of a wavelength confined within the Reststrahlen band of the polar-dielectric material. Upon being illuminated by the beam, the polar-dielectric structure will exhibit localized SPhP resonances commensurate with the size and shape of structure. The observation of this resonance occurs when the real permittivity of the material is equal in magnitude, but opposite in sign to a geometrical constant that is defined by the shape of the particle (e.g. the geometrical constant is 2 for spherical particles). By injecting additional carriers (i.e. electrons or holes) into the polar-dielectric material, values of the real permittivity within the Reststrahlen band become more negative, which shifts the resonance condition to higher energy, and also alters the index of refraction, and so in accordance with the present invention, the resonant wavelength $\lambda_{res}$ and/or the index of refraction $n_r$ of the material can be selectively tuned by directly injecting charge carriers into the material by means of an optical pump beam or an electrical voltage source.

Thus, the present invention provides optical modulators whose optical response can be quickly and easily tuned by varying the charge carrier density in the polar-dielectric materials in the device. By taking advantage of the ability to do so, various devices can be designed wherein input infrared light can be modulated to provide output having a desired wavelength, intensity, and/or phase; desired thermal emission spectral response; desired response to analyte molecules; or desired beam direction, or which can be turned on and off at very high speeds.

Various embodiments of such optical devices employing one or more aspects of the present invention will now be described with respect to the accompanying FIGURES which form a part of the present disclosure. It will be understood by one skilled in the art that the FIGURES are merely block diagrams illustrating the main elements of the exemplary devices depicted therein, and that additional elements may be included in actual devices fabricated in accordance with the present invention. It will also be understood that the devices illustrated in the FIGURES are merely exemplary, and that other devices within the scope of the present invention may be developed using the inventive principles described herein.

It will be noted that corresponding elements of the embodiments illustrated therein have corresponding numbering in the various FIGURES. For example, local surface-phonon-polariton (LSPhP) resonant antennas are numbered as 101 in FIG. 1 and as 301 in FIG. 3, while the source of additional charge carriers is shown as pump beam 103/303 in FIGS. 1 and 3, respectively, and as voltage source 503/603, respectively, in FIGS. 5 and 6. In addition, in some cases, reference numbers for one or more features illustrated in a given FIGURE might be omitted for the sake of brevity and compact description where that feature is not germane to the embodiment being illustrated and described therein.

In addition to the devices described herein, the present invention also provides methods for modulating an incoming infrared (~50-3500 cm$^{-1}$) beam incident onto a device through tuning of the charge-carrier density in polar-dielectric features of the device to produce an output beam having desired characteristics or for turning the output beam on and off at a high rate of speed. Thus, in accordance with the present invention, a characteristic of an incoming beam incident on a polar-dielectric structure can be modulated by pumping the charge carrier density through either an optical pump beam or a voltage source. Such changes in carrier density alter the resonant wavelength $\lambda_{res}$ of polar-dielectric LSPhP resonant antennas and/or the refractive index $n_r(N, \lambda)$ of a polar-dielectric SPhP or ENZ-based waveguide in the device. As the incoming beam interacts with the polar-dielectric materials in the device, these changes in resonant wavelength and/or refractive index affect the way the beam is reflected and/or transmitted through the device. By altering the added charge carrier density, either by altering the intensity of the optical pump beam or by altering the applied voltage, an output beam having a desired wavelength, amplitude, or phase can be produced or can be turned on or off at a desired speed.

Figure 2:
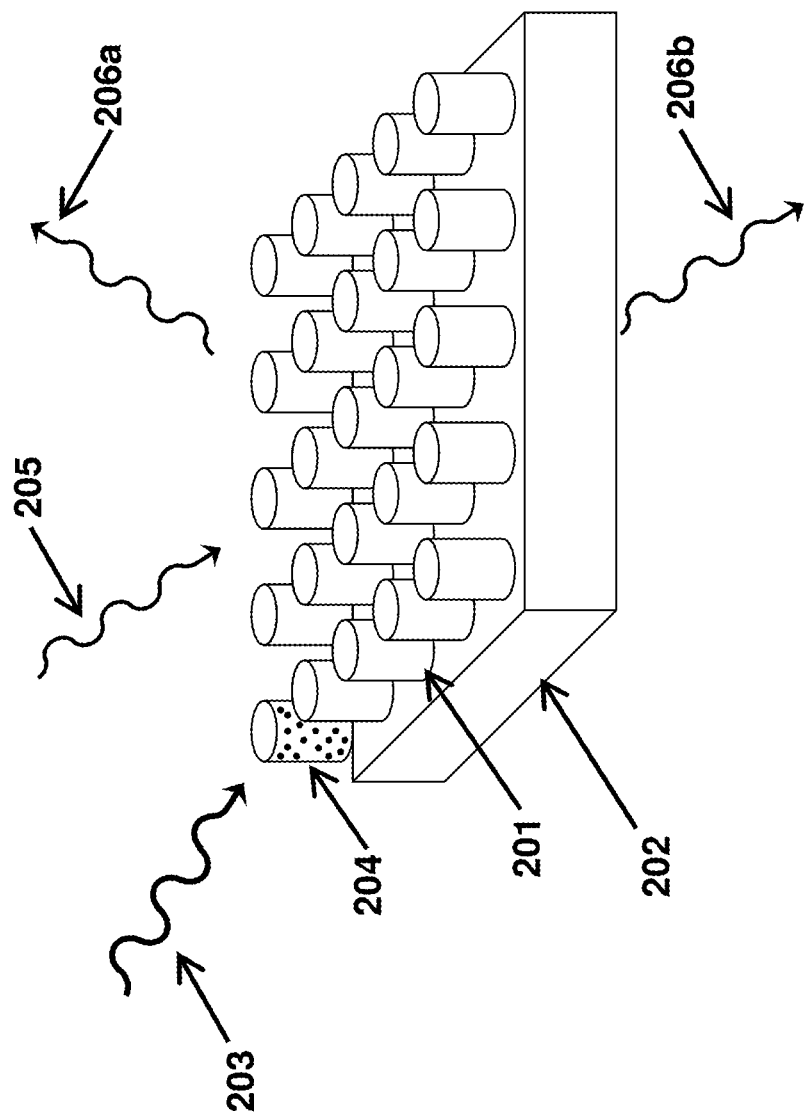
FIG. 2 is a block diagram illustrating aspects of an optically stimulated polar-dielectric optical device in accordance with the present invention.

A brief description of the physical processes utilized in the present invention will now be provided with respect to FIGS. 1 and 2.

FIG. 1 is a block diagram providing an overview of the general structure of an actively tunable polar-dielectric optical device in accordance with the present invention, while FIG. 2 is a block diagram illustrating an exemplary optically pumped embodiment of such a device.

As shown in FIG. 1, an optical device in accordance with the present invention comprises one or more polar-dielectric structures such as LSPhP resonant antennas 101 arranged on a substrate 102. The structures 101 are configured so as to exploit the metallic nature imparted to polar-dielectrics by surface phonon polaritons (SPhPs) as described above. These structures can be made from any suitable material, e.g., SiC or GaN, in any suitable physical form, for example, nano- or micro-pillars, disks, bars, wires, bowties or ellipsoids, etc. In accordance with the present invention, as described in more detail below, additional charge carriers 104 can be controllably introduced into the dielectric structures, e.g., optically by a pump beam 103a in some embodiments or electrically by an electrical current from voltage source 103b in others.

As described in more detail below, by controllably changing the concentration of charge carriers 104 in the polar-dielectric structures 101, the index of refraction $n_r$ and/or the resonant wavelength $\lambda_{res}$ of the structures can be controllably tuned so that incoming infrared light 105 can be modulated to provide an output beam having a desired wavelength, a desired amplitude, and/or a desired phase.

The overall principles of operation of an actively tunable polar-dielectric optical device in accordance with the present invention will now be described in the context of an optically pumped device such as that illustrated in FIG. 2. These principles of operation can be understood by first considering an isolated polar-dielectric structure, e.g., an isolated single nanopillar of the nanopillar antennas 201 shown in FIG. 2. Prior to the introduction of carriers thereinto, the antenna resonates at a wavelength $\lambda$ given by solving the following equation for $\lambda$:

$$\in_1(\lambda) = g\in_a, \quad (2)$$

where $\in_a$ is an effective dielectric function of the surrounding medium (e.g., $\in_a \approx 1$ for air). The coefficient g is determined by the shape of the polar-dielectric structure and the polarization of the incident light-beam 205 to be modulated, relative to the shape of the nanoantenna (e.g., g=−2 for an isolated sphere, but is more negative for an elongated shape when the polarization is along the long axis).

To effect modulation of incoming infrared light, in the optically pumped embodiment illustrated in FIG. 2, the array is illuminated with a pump light beam 203. For illustration, we again consider an isolated antenna of the array of nanoantennas 201. If the photon energy of the pump light beam exceeds the bandgap of the dielectric, free charge-carriers 204 in the form of electron-hole pairs are generated in the nanoantennas, with the number and density of these free charge-carriers varying with the intensity of the pump beam. These optically pumped carriers require adding a "Drude-like" term, $\in_{1,Drude}(N, \lambda)$, to the dielectric function $\in_1(\lambda)$ of the polar-dielectric, where N is the total density of charge-carriers. In general, the background density of charge carriers in the polar-dielectric can be made negligible, so that N generally represents the optically pumped carrier density. The resonant frequency now changes, as dictated by the new solution for the resonant wavelength $\lambda_{res}$ in the altered overall dielectric function:

$$\in_{1,tot}(\lambda_{res}) = \in_1(\lambda_{res}) + \in_{1,Drude}(N, \lambda_{res}) = g\in_a. \quad (3)$$

In this way, the resonant wavelength $\lambda_{res}$ of the polar-dielectric antennas can be finely tuned by controlling the intensity of incident pump beam 203, which in turn controls the pump carrier density N in the polar-dielectric material. In addition, because both the reflected and transmitted light 206a/206b from incident light beam 205 are sensitive to the dielectric function of the material, controlling the intensity of the pump beam and thereby altering the charge carrier density, an incident light beam can be modulated so that the reflected beam 206a and the transmitted beam 206b have desired characteristics such as modulated intensity or altered wavelength components requisite to a tuned-wavelength filter or tuned-wavelength source. In other embodiments, other structures could be used, such as metamaterial structures having a negative index of refraction or birefringent or hyperbolic media (i.e. where the orthogonal optical axes exhibit positive and negative permittivities simultaneously, such as in hexagonal boron nitride), whereby the carrier injection would modulate the corresponding index of refraction, birefringence or individual ordinary and/or extraordinary permittivities to modify the degree of hyperbolicity as well.

Figure 3A:
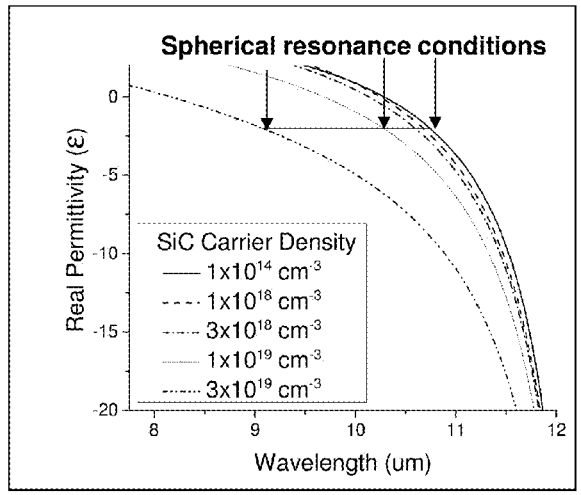
FIGS. 3A-3C are plots that illustrate the means for tuning the resonant wavelength of an SPhP resonant antenna, and the response of an SPhP resonant antenna, using SiC as an exemplary material.
Figure 3B:
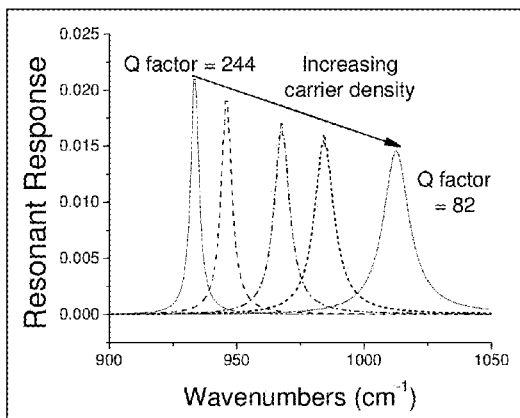
Figure 3C:
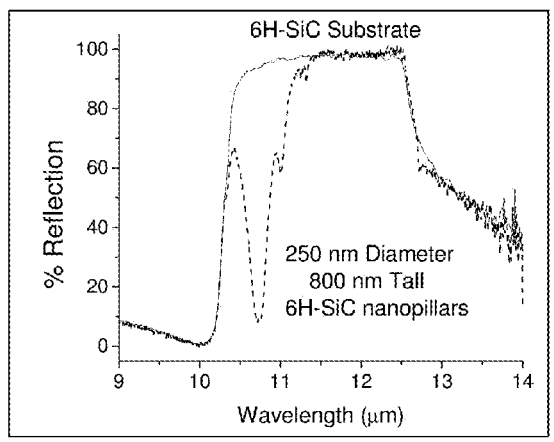

FIGS. 3A-3C are plots illustrating some exemplary results of the principles described above.

FIG. 3A summarizes computations that demonstrate how the optical permittivity varies with the density of charge carriers within the material and illustrates the computed real-part of the dielectric function, $\in_{1,tot}(\lambda)$, of SiC, including the contribution of various carrier densities. The variation in $\in_{1,tot}(\lambda)$ as the carrier concentration N is changed is evident. The resonant condition for an isolated spherical antenna is also indicated. FIG. 3B displays the lineshapes for the corresponding resonant bands and shows how the computed resonant wavelength of a spherically shaped LSPhP resonant antenna shifts with varying charge-carrier density within the antenna. FIG. 3C is a plot showing the results of an experimental example of the Reststrahlen band for bare 6H—SiC substrate (shown by the solid curve) and of an array of SiC nanopillar antennas having a diameter of about 250 nm and a height of about 800 nm (dotted curve), and shows that the light beam reflected from the nanopillar array exhibits a dip at the antenna resonant frequency, $\lambda_{res}$.

Modulation can be understood by referring to FIG. 2 and FIGS. 3B and 3C. If substrate 202 is not highly reflecting, the reflected light-beam 206a will exhibit a spectrum with a resonant peak very similar to that shown in FIG. 3B for a particular carrier concentration N, while if incident beam 205 is broad band, the array in reflection assumes the function of narrow-band source that is tunable by altering N. Note the extremely broad tuning range (up to 20%) compared to other sources in this wavelength range, such as lead-salt and quantum-cascade lasers, which are currently on the order of 0.4% for distributed feedback quantum-cascade lasers (DFB-QCLs) and up to 10% for bulky external-cavity QCLs (EC-QCLs). See, e.g., the tunable IR Quantum Cascade Laser Sources produced by Boston Electronics Corporation, described at http://www.boselec.com/products/irtun.html.

If substrate 202 is transparent, the transmitted light-beam 206b will exhibit a dip in transmission at the local surface-phonon (LSPh) resonance wavelength $\lambda_{res}$, which shifts with the carrier density N of the nanoantennas in the same manner as does the reflected light-beam.

If, on the other hand, instead of being transparent, substrate 202 is highly reflective or is made of the same material as the nanoantennas 201, as in FIG. 3C, the behavior of the reflected and the transmitted light-beams is reversed. In such a case, the substrate would be highly reflecting in the Reststrahlen spectral band, with a dip in reflectance at the LSPh resonance at the tuned $\lambda_{res}$ as illustrated in FIG. 3C. If the substrate is sufficiently thin, the light beam 206b that is transmitted through the substrate will exhibit a tunable peak at $\lambda_{res}$, with the peak being tunable through the tuning of $\lambda_{res}$ in accordance with the present invention as described herein.

An optically pumped tunable polar-dielectric optical device in accordance with the present invention can be configured for numerous applications, and some of those applications will now be described. For example, devices in accordance with the present invention can execute many typical modulating functions, including optical switching and amplitude modulation, and can serve as an agilely tunable frequency filter or source in the infrared wavelength range. It should be noted that the applications described are merely exemplary, and other applications may also be developed within the scope and spirit of the present invention.

When employed as a source of a beam input into a photodetector or other receiver, an actively tunable polar-dielectric optical modulator in accordance with the present invention can be used as part of a molecular sensor because the Reststrahlen band often occurs in the infrared where vibrational fingerprinting of molecular species is possible.

FIGS. 4A-4E illustrate various aspects of an exemplary embodiment of an optically controlled actively tunable polar-dielectric optical modulator used as a sensor in accordance with the present invention. In such a sensor, detection of an analyte object such as adsorbed or proximate particulates or gas or liquid molecules 407a/407b can be achieved through measurement of the reflection 406 from incoming light 405 in the infrared or other spectral range, though, of course, in other embodiments detection can be achieved through measurement of light transmitted through the sensor. A novel aspect of this approach is the use of the reflective array as the sensing platform itself, which exploits the strong optical fields around the nanoantennas to also enhance the response through the surface-enhanced infrared absorption (SEIRA) effect. See Bukasov, supra; Aroca, supra; and Anderson, supra. Other analyte objects that can be detected using a sensor device in accordance with the present invention include but are not limited to proteins, polymers, or coatings.

Figure 4E:
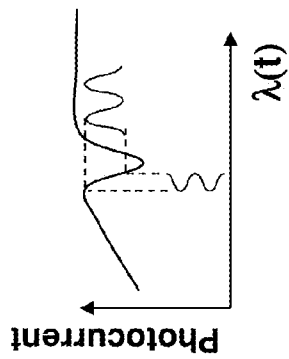
FIGS. 4A-4E are block diagrams illustrating aspects of an exemplary sensor comprising a polar-dielectric optical device in accordance with the present invention.
Figure 4D:
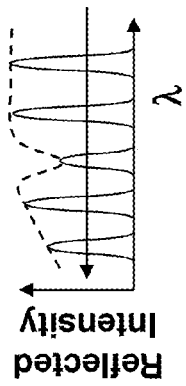
Figure 4A:
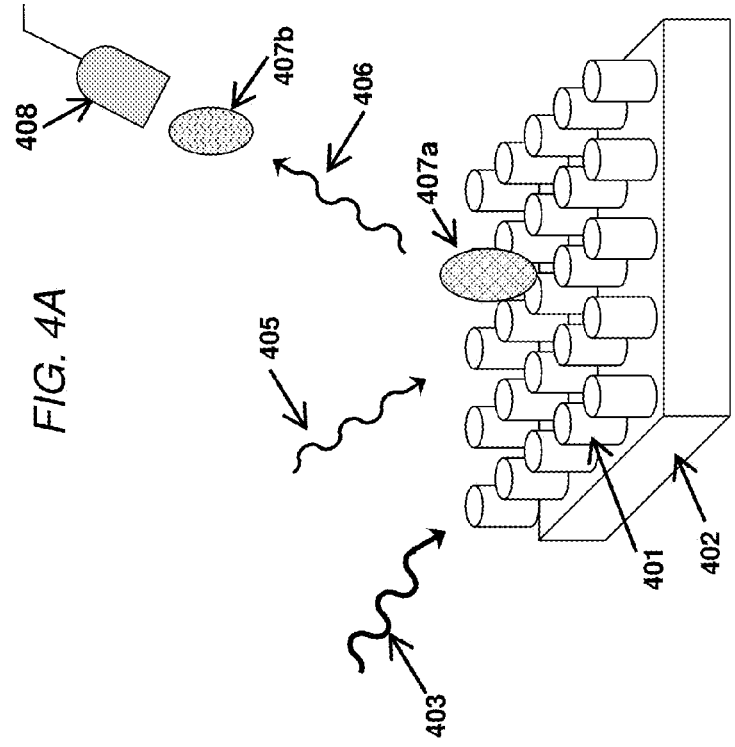
Figure 4C:
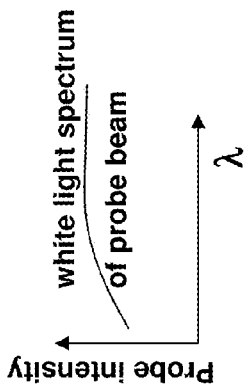
Figure 4B:
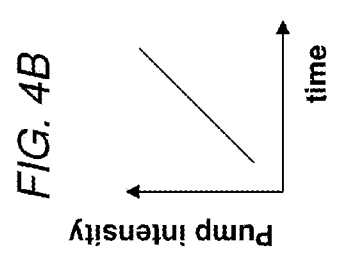

As shown in FIG. 4A, a molecular sensor in accordance with the present invention can include a tunable polar-dielectric modulator comprising an array of polar-dielectric antenna elements, e.g., nanopillars 401, arranged on a substrate 402, where the charge carrier density in the antennas is optically pumped by means of pump beam 403 illuminating the antenna array. In the exemplary case illustrated in FIG. 4, the intensity of the pump beam 403 is increased over time, to inject an increasing density of charge carriers into the nanoantennas, with five different values of pump intensity being applied at five different times, though in other embodiments the pump intensity can be swept continuously. At the same time, a probe beam 405 interrogates the antenna array, with the probe beam having a spectrum as shown schematically in FIG. 4C.

As shown in the FIGURE, an incoming probe beam 405 is directed at the sensor. When the sensor is illuminated by the probe beam 405, the probe beam reflects as beam 406 with a modified spectrum as illustrated by one of the peaks in FIG. 4D, with the particular peak being determined by the resonant wavelength of the nanoantennas 401, which in turn is determined by the particular charge-carrier density within a nanoantenna that corresponds to the intensity of pump beam 403. Molecules 407a adsorbed directly on the nanoantennas will exhibit surface-enhanced IR absorption (SEIRA) of the probe beam 405, producing less reflected light 406 at the absorption wavelength, while detection of remote molecules 407b not adsorbed on the sensor surface is achieved through ordinary infrared absorption spectroscopy of the reflected light 406.

In either case, the light is then received at photodetector 408 with an intensity reduced at the particular absorption wavelength characteristic of the molecule. This wavelength is sensed by varying the intensity of pump beam 403, and thus the resonant wavelength of the nanoantennas 401, which tunes the wavelength being reflected in beam 406. When this wavelength matches the absorption wavelength of molecule 407a or 407b, less intensity is received by the detector 408, as illustrated by the reduced amplitude in FIG. 4D of the peak at the absorption wavelength. The vibrational absorption associated with the molecules is then detected as a reduced intensity of the reflected light-beam 406, as shown by the dashed curve in FIG. 4D.

In addition, it is possible to improve the background discrimination and sensitivity against 1/f noise by exploiting the invention's modulation capability to enable phase-sensitive detection. In this situation, the intensity of the pump light (or drive current in the electrically driven variant below) is weakly modulated periodically at a frequency f, and the detector includes a lock-in amplifier. The antennas' resonant wavelength will acquire a small periodic modulation on top of the wavelength ramp, as depicted by the vertically running sine wave shown in FIG. 4E. The presence of analyte molecules will create a corresponding periodic variation in the detected photocurrent, as indicated by the horizontal sine wave in FIG. 4E. Similar results can also be achieved with rapid scanning (>1 kHz scan rate) without the signal reduction due to demodulation.

Improved selectivity in the scheme of FIGS. 4A-4E, as well as other schemes, could be achieved, for example, by depositing on the antennas a specialized thin coating (e.g., a polymer) designed to selectively adsorb analyte molecules of interest and to concentrate the molecules on or near the antennas. Polymer films are routinely made thin enough to transmit sufficient infrared radiation to maintain the sensing function.

These devices can also serve in a sensing approach analogous to plasmonic LSPR sensing. In such devices, the adsorption of molecules alters the dielectric environment of the antennas and thus shifts their resonant frequency. The shift in frequency can be detected by spectroscopically interrogating the array. However, in accordance with the present invention, the antenna's resonant wavelength can be tuned to occur at an inflection point of the analyte IR vibrational spectrum, so that the presence of an analyte would be announced as a change in reflected or transmitted intensity, without use of an external monochrometer or spectrometer to spectroscopically interrogate the array.

Similar sensing configurations are also possible with electrical bias control of carrier density as described below.

In many cases, electrical modulation may be highly desirable for reasons of size, weight, efficiency, and ease of use of the device. FIGS. 5-8 are block diagrams depicting aspects of some exemplary embodiments of an electrically controlled modulator in accordance with the present invention. Like the optically controlled devices described above, these electrically controlled modulators alter the resonant wavelength $\lambda_{res}$ of a nanoantenna through the introduction of mobile carriers into the antenna.

Figure 5:
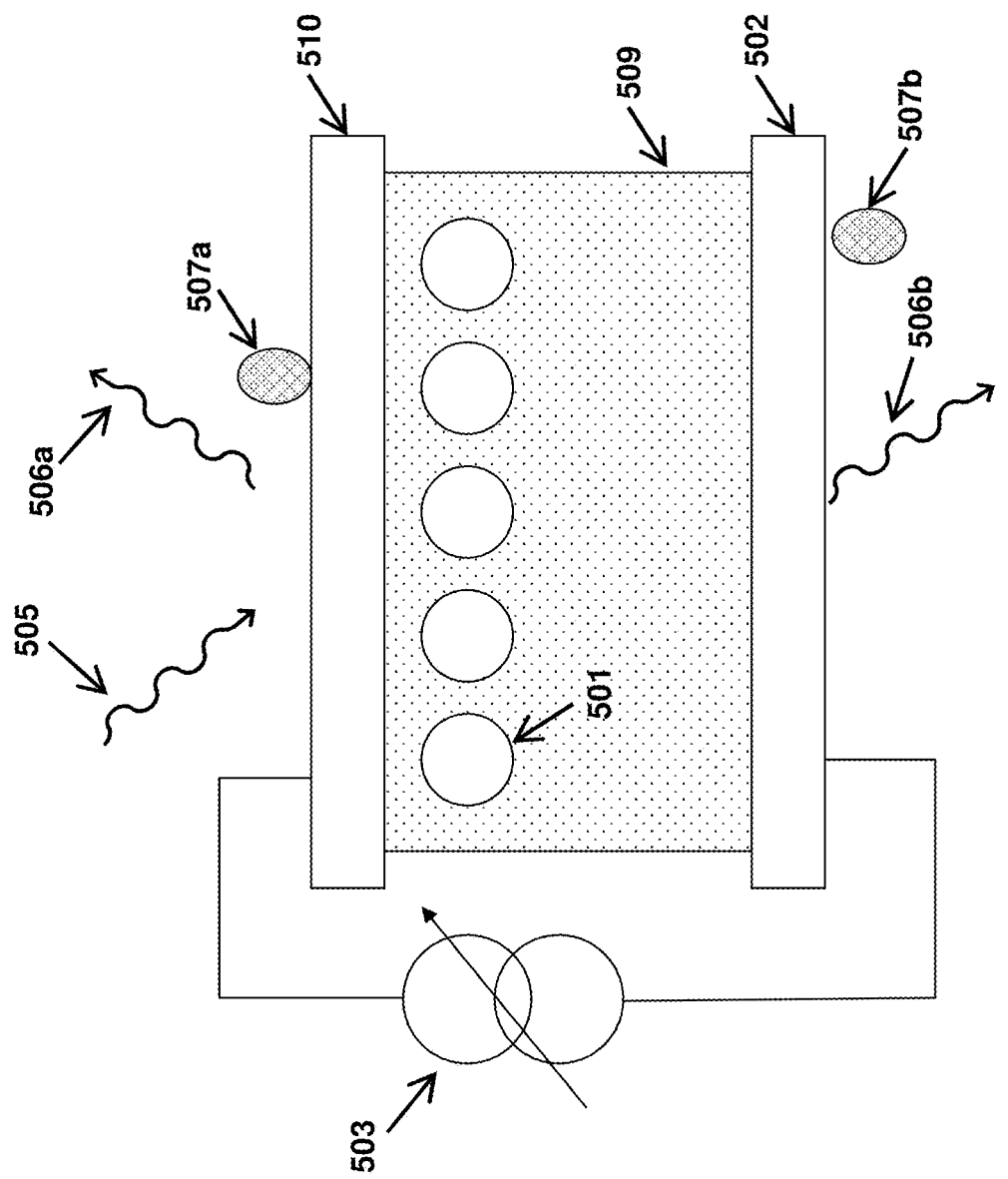
FIG. 5 is a block diagram illustrating aspects of an exemplary electrically stimulated SPhP optical device in accordance with the present invention.

FIG. 5 illustrates a first exemplary embodiment of an electrically controlled actively tunable polar-dielectric optical modulator in accordance with the present invention. As shown in FIG. 5, such a device includes a collection of local surface-phonon-polariton (LSPhP) resonant nanoantennas 501 situated in an insulator 509 on a substrate 502. The antennas 501 are positioned in the insulator so that they are within tunneling distance of transparent electrode 510 connected to voltage source 503 Electrode 510 should be configured to be sufficiently transparent so as to permit probe beam 505 to reach antennas 501 and to permit beam 506a reflected from the antennas to escape the device, while, if desired, substrate 502 also should be sufficiently transparent to permit beam 506b to be transmitted through the device.

Analogous to the optically pumped embodiments described above, electrons controlled by voltage source 503 are introduced into the array of nanoantennas 501 via tunneling current from electrode 510, where the tunneling current injects charge into the nanoantennas, thereby tuning the center wavelength of the narrow reflected band at the resonant wavelength $\lambda_{res}$ of the nanoantenna. As with the optically pumped devices described above, an infrared light beam 505 incident on nanoantennas 501 is modulated by the device to produce reflected beam 506a and/or transmitted beam 506b. By altering the carrier density N in the nanoantennas, incident beam 505 is modulated to produce reflected and/or transmitted beams having a desired resonant wavelength or amplitude, depending on the characteristics of the incident beam 505.

The electrically driven approach illustrated in FIG. 5 can be used in a vibrational sensing application whereby molecules 507a adsorbed on the top electrode 510 can be detected by reflected beam 506a and/or molecule 507b, adsorbed on the substrate, can be detected by transmitted beam 506b. In addition, if the tunneling electrode 510 is sufficiently thin (as would be the case if it were made from graphene), SEIRA detection could be possible.

Figure 6:
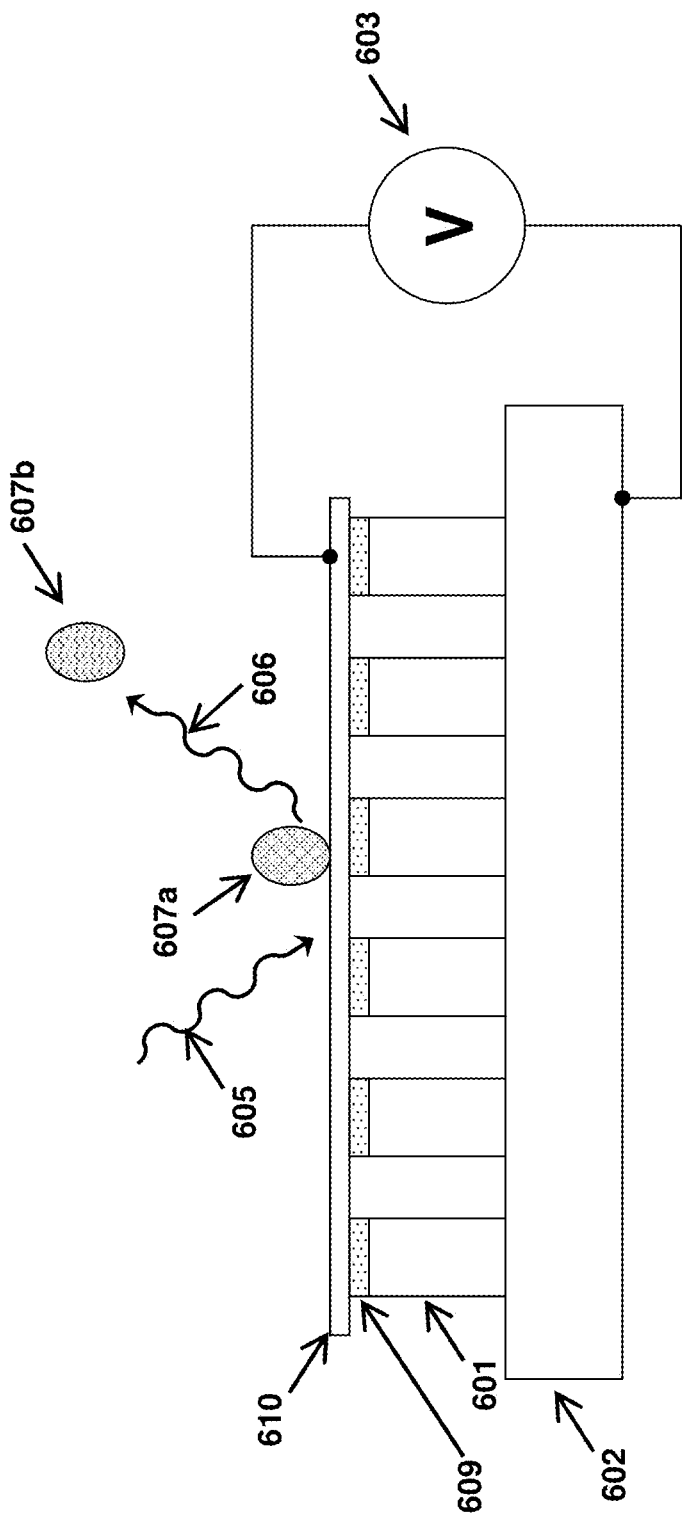
FIG. 6 is a block diagram illustrating aspects of another exemplary electrically stimulated SPhP optical device in accordance with the present invention.

FIG. 6 depicts another exemplary embodiment of an electrically controlled actively tunable polar-dielectric optical modulator in accordance with the present invention. In this embodiment, as shown in FIG. 6, an array of LSPhP resonant antennas 601 is fabricated on a substrate 602, where substrate 602 in this embodiment being a highly doped semiconductor such as the polar-dielectric itself, or Si, or other suitable semiconductor. Fabrication of the antennas can be accomplished via any suitable method, such as epitaxial growth of SiC on a highly doped Si substrate or growth of III-nitride materials such as GaN, AlN, or AlGaN on an Si or SiC substrate, followed by standard lithographic patterning and etching processes or via the direct epitaxial growth of nanostructures such as nanowires. Once the array of antennas 601 is fabricated, a thin insulating barrier layer 609 is deposited on an upper surface of the antennas and a transparent conducting layer 610 is placed on top of the array. Conducting layer 610 can be a thin chemical vapor deposition (CVD)-grown or transferred graphene layer, a thin conducting oxide, an optically thin metal, an ITO layer, or a thin (<10 nm) atomic layer deposition (ALD) metal film, but is not limited to those materials and can be made from any suitable material having a transparency sufficient to permit penetration by probe light beam 605 and reflected beam 606.

Voltage source 603 is connected to conducting layer 610 and substrate 602. When a voltage V is applied, carriers are drawn into the antennas 601 from substrate 602. The polarity of voltage V is determined by the substrate doping, and to most efficiently inject carriers from the substrate to the antennas, the applied voltage should be configured to have a bias appropriate to draw the majority carrier type from the substrate into the nominally undoped SPhP nanostructures.

Thus, in accordance with the present invention, by varying the voltage from voltage source 603, the charge-carrier density of the antennas, and thus the antenna resonance wavelength $\lambda_{res}$, can be quickly and easily tuned. As a result of this tuning, incident beam 605 is reflected from the antennas, with its spectral characteristics determined by the antenna resonance. In addition, as with the optically pumped embodiment described above with respect to FIG. 4, adsorbed molecule 607a and/or free molecule 607b can be sensed by means of their modification through vibrational absorption of the incident beam and/or the reflected beam 606.

Figure 7:
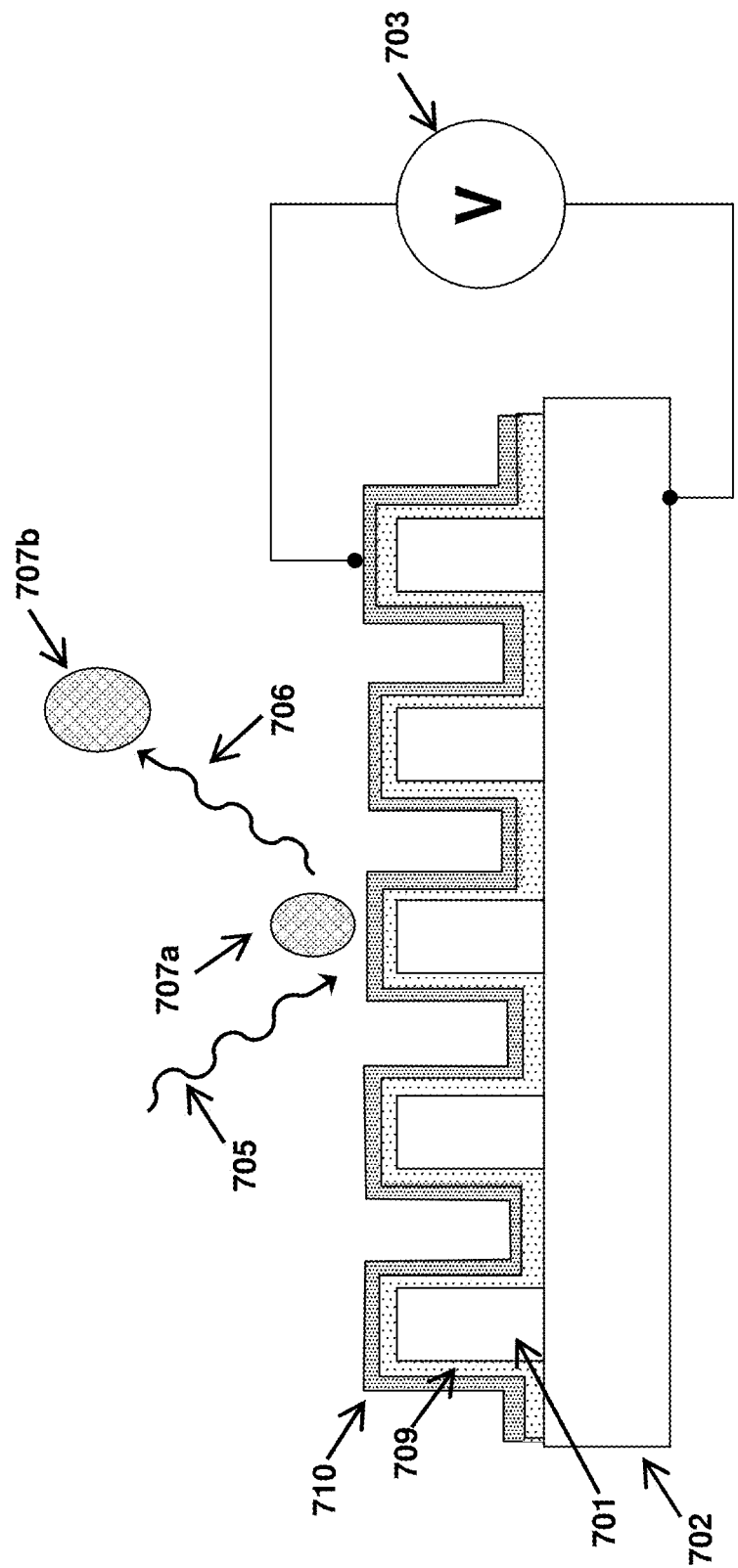
FIG. 7 is a block diagram illustrating aspects of another exemplary electrically stimulated SPhP optical device in accordance with the present invention.

FIG. 7 illustrates another exemplary embodiment of an electrically controlled actively tunable polar-dielectric optical modulator in accordance with the present invention. The embodiment depicted in FIG. 7 is similar to that shown in FIG. 6, except that in the embodiment illustrated in FIG. 7, insulating barrier layer 709 and conducting layer 710 are grown conformally over the nanoantennas 701 and substrate 702. Growth of barrier layer 709 can be accomplished by any suitable means, such as ALD of ZnO, $Al_2O_3$, or $SiO_2$, or through the CVD growth of nanocrystalline diamond films. As with the embodiment described above with respect to FIG. 6, conducting layer 710 can be formed from any suitable material such as graphene, a thin conducting oxide, or an optically thin metal and can be conformally formed over barrier layer 709 by any suitable method such as CVD, ALD, or transfer.

The device operates in the same manner as does the device illustrated in FIG. 6, with voltage source 703 providing an appropriately biased voltage which causes charge carriers from doped substrate 702 to move to the undoped SPhP antennas 701, thereby changing their resonant wavelength $\lambda_{res}$. When the modulator is configured for use as a sensor, analyte molecule 707a adsorbed on the surface and/or free analyte molecule 707b can be detected and analyzed through their interaction with the reflected beam 706 from probe beam 705. As with the prior embodiments, in accordance with the present invention, by tuning the charge carrier density in the nanoantennas, the resonant wavelength $\lambda_{res}$ of the antenna array—and thus the characteristics of the reflected beam—can be tuned to provide a desired response to an analyte molecule of interest.

It will be noted that in the embodiments of both FIG. 6 and FIG. 7, in some cases, the Schottky barrier occurring in the polar-dielectric at its junction with the conducting electrode can serve as a barrier to charge-carrier transport, in which case an insulating barrier layer is not needed.

Figure 8:
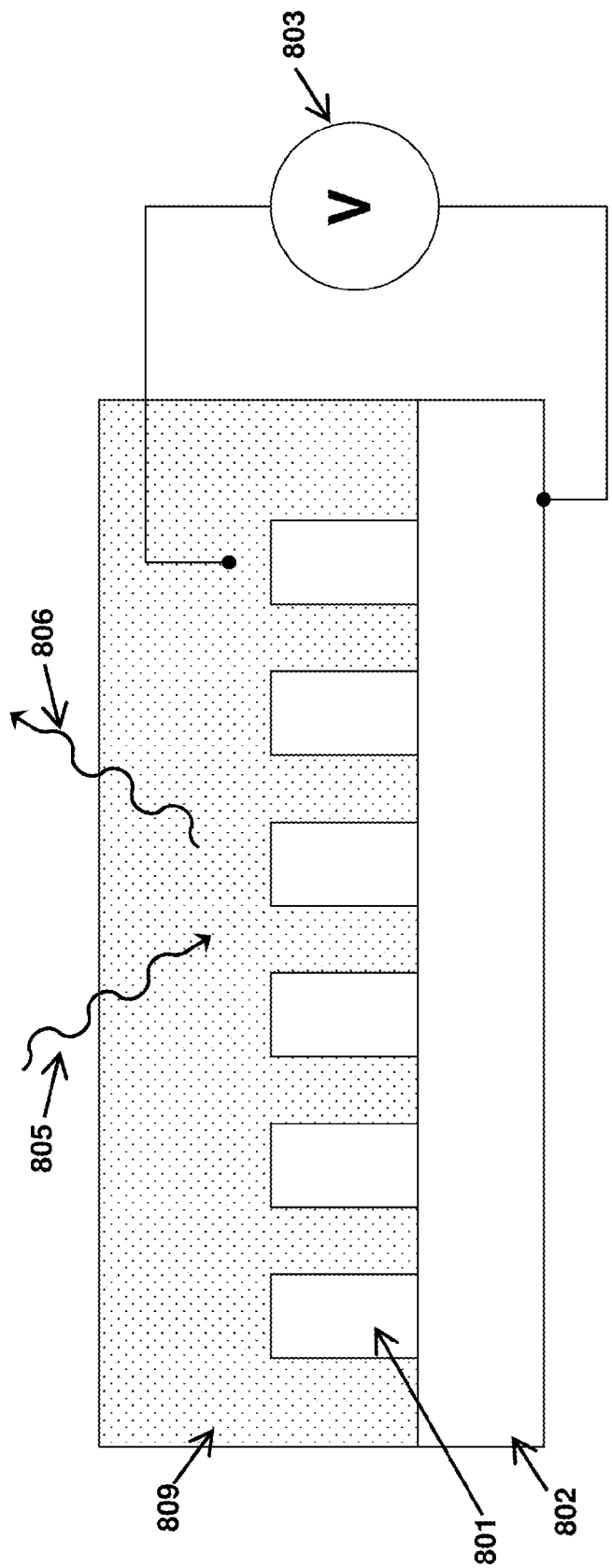
FIG. 8 is a block diagram illustrating aspects of another exemplary electrically stimulated SPhP optical device in accordance with the present invention.

FIG. 8 illustrates another exemplary embodiment of an electrically controlled actively tunable polar-dielectric optical modulator in accordance with the present invention. In the embodiment illustrated in FIG. 8, electrical control of the modulator is effected by electrochemical bias. Thus, as shown in FIG. 8, the device includes an array of SPhP nanoantennas 801 on a substrate 802, where the nanoantennas are situated in an electrolyte solution 809. One electrode from voltage source 803 contacts the electrolyte solution, while the other electrode contacts the substrate. When an appropriately biased voltage from voltage source 803 is applied, charge carriers are drawn from electrolyte solution 809 into the antennas 801. As in the other embodiments in accordance with the present invention, the added charge carriers affect the resonant wavelength—and thus the optical response—of the antennas, which then affect the characteristics of beam 806 reflected from incident beam 805.

The modulation functions described thus far rely on optical antennas in which the electromagnetic resonance is locally confined. The same sensitivity of the optical properties of phonon-polaritonic materials to introduced charge carriers can also be exploited to perform useful functions in waveguides made of polar-dielectrics that support propagating phonon-polaritonic modes. These modes are confined to a surface, but are not localized, in the sense that they propagate as a wave along the surface, i.e., on the interface between the polar-dielectric and the overlying dielectric material. Analogous waves on plasmonic metal surfaces are well known, see, e.g., A. V. Zayats, I. I. Smolyaminov, and A. A. Maradudin, "Nano-optics of surface plasmon polaritons," *Physics Reports*, 2005, 81, 131-314, but these cannot be controlled by injecting carriers because of the large background density of carriers in a metal. Instead, to effect control, the dielectric environment around the metal waveguide must be altered. See U.S. Patent Application Publication No. 2012/0057215 by H. Suh, C. W. Lee, Y. Park, and J. Kim, "Surface plasmon polariton modulator" (Mar. 8, 2012).

In other embodiments, the present invention provides actively tunable polar-dielectric waveguides in which the phase of an SPhP beam propagating along the surface of a polar-dielectric material can be modulated through the use of charge carriers injected directly into the material. When dealing with the phase of travelling waves, the principle of operation is best described using the refractive index $n_r(N,\lambda)$, which is related to the dielectric function $\in_1(N, \lambda)$ described above, where again N is the concentration of charge carriers. Through the established properties of wave propagation, we know that if the optical phase $\phi$ of an incoming SPhP beam is taken as zero at some location, then in the absence of optical pumping, the phase of the output SPhP beam at a different location removed by a distance L is $\phi=2\pi L n_r(0,\lambda)/\lambda$, where L is the distance between the two locations of the input and output beams. When charge carriers of concentration N are introduced into the waveguide, either by an optical pump beam or by a voltage source as described above, the refractive index $n_r(N,\lambda)$ of the material is altered, and the phase of the output SPhP-beam assumes a new value $\phi=2\pi L n_r(N,\lambda)/\lambda$.

Figure 9:
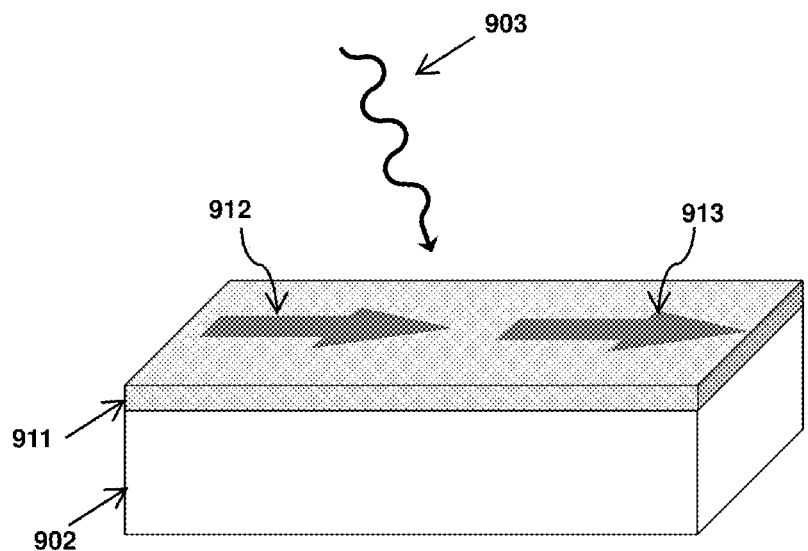
FIG. 9 is a block diagram illustrating general aspects of an exemplary optically stimulated SPhP waveguide in accordance with the present invention.
Figure 10:
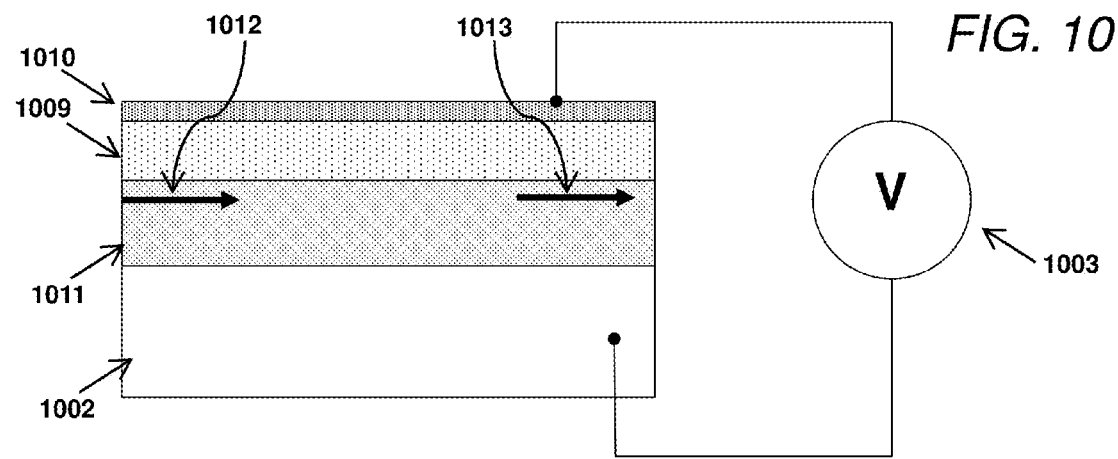
FIG. 10 is a block diagram illustrating general aspects of an exemplary electrically stimulated SPhP waveguide in accordance with the present invention.

FIGS. 9 and 10, respectively, depict exemplary embodiments of an optically and an electrically pumped actively tunable polar-dielectric phase modulator in accordance with the present invention. As shown in FIGS. 9 and 10, in both cases, a SPhP waveguide 911/1011 rests on a substrate 902/1002, though in some embodiments, the waveguide may be free-standing.

In the embodiment illustrated in FIG. 9, an incoming SPhP beam 912, which is confined to the surface of the waveguide, is excited on the waveguide through an end-fire, grating, or prism arrangement (not shown). In accordance with the present invention, the phase of the output SPhP beam 913 is modulated by changes in the refractive index of the waveguide induced by charge carriers pumped into the waveguide by the optical pump-light beam 903 in a manner described above.

In the embodiment illustrated in FIG. 10, charge carriers from doped substrate 1002 are drawn into the SPhP waveguide 1011 by a voltage from voltage source 1003 applied to gate electrode 1010, which is situated on an upper surface of waveguide 1011, which may be separated from the waveguide by optional barrier layer 1009, depending on the electrical characteristics of the materials constituting substrate 1002, waveguide 1011, and gate electrode 1010. In accordance with the present invention and as described above, an SPhP beam is input into the waveguide, and by controlling the voltage and thus the charge-carrier density in the waveguide, the phase of the output SPhP beam 1013 can be controlled.

In some embodiments, SPhP waveguides in accordance with the present invention can be configured to produce switching and/or amplitude modulation through the phenomenon of interferometric phase modulation. In the exemplary embodiments illustrated in FIGS. 11 and 12, such switching and/or amplitude modulation can be effected using a waveguide in accordance with the present invention which is configured to act as a Mach-Zehnder interferometer.

Figure 11:
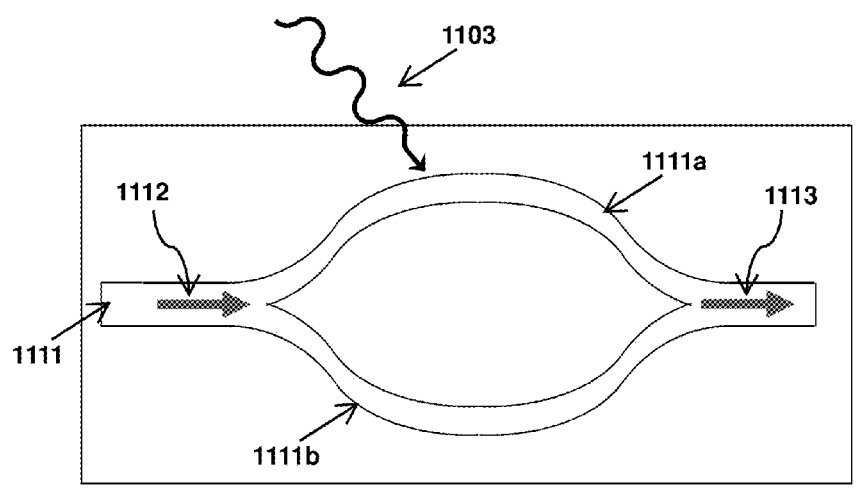
FIG. 11 is a block diagram illustrating aspects of an exemplary Mach-Zehnder optical switch comprising an optically stimulated SPhP waveguide in accordance with the present invention.

FIG. 11 is a block diagram illustrating aspects of an optically pumped Mach-Zehnder interferometer in accordance with the present invention. As shown in FIG. 11, an input SPhP beam 1112 travelling along an SPhP waveguide 1111 is split between two arms 1111a and 1111b. Charge carriers are pumped into arm 1111a by pump light beam 1103, which cause a phase shift in the SPhP beam travelling along arm 1111a relative to the SPhP beam travelling along arm 1111b. The resulting phase shift in the pumped arm produces an interference between the beam that exits arm 1111a and the beam that exits arm 1111b which causes a change in the amplitude of the SPhP beam 1113 that is formed when the two beams on each arm recombine. By alternating the intensity of pump beam 1103 between two suitable values, beam 1111a can be made to either constructively or destructively interfere with beam 1111b, causing the amplitude of output beam 1113 to alternate between a maximum and minimum value, thereby implementing an optical switch that turns the output beam on and off.

Figure 12:
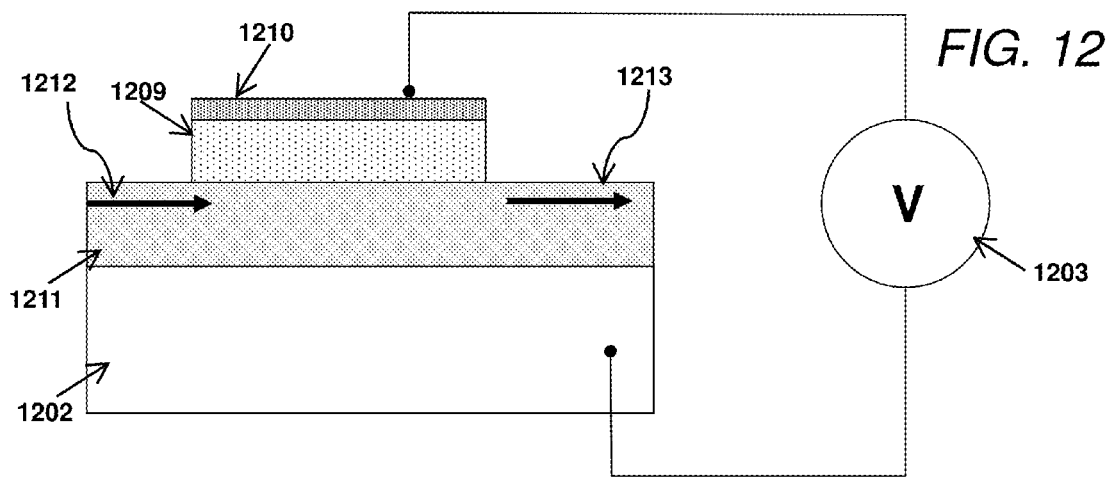
FIG. 12 is a block diagram illustrating aspects of an exemplary electrically stimulated SPhP waveguide in accordance with the present invention.

FIG. 12 is an electrically pumped version of the Mach-Zehnder modulator shown in FIG. 11. In the electrically pumped embodiment illustrated in FIG. 12, polar-dielectric waveguide 1211 is situated between highly doped substrate 1202 on a bottom surface thereof and gate electrode 1210 on a top surface thereof, with the gate electrode being separated from waveguide 1211 in some embodiments by optional barrier layer 1209. Charge carriers from substrate 1202 are drawn into waveguide 1211 by voltage source 1203 contacted to the substrate and to gate electrode 1210. In this embodiment, the waveguide 1211 acts as the active arm of the interferometer, and the charge carriers added to waveguide/active arm 1211 modulate the phase of input SPhP beam 1212 as it travels through the waveguide and is output as output beam 1213. As with the other electrically pumped embodiments described herein, in some cases, barrier layer 1202 may be omitted depending on the electrical characteristics of the materials constituting the substrate 1202, the waveguide 1211, and the gate electrode 1210.

Figure 13:
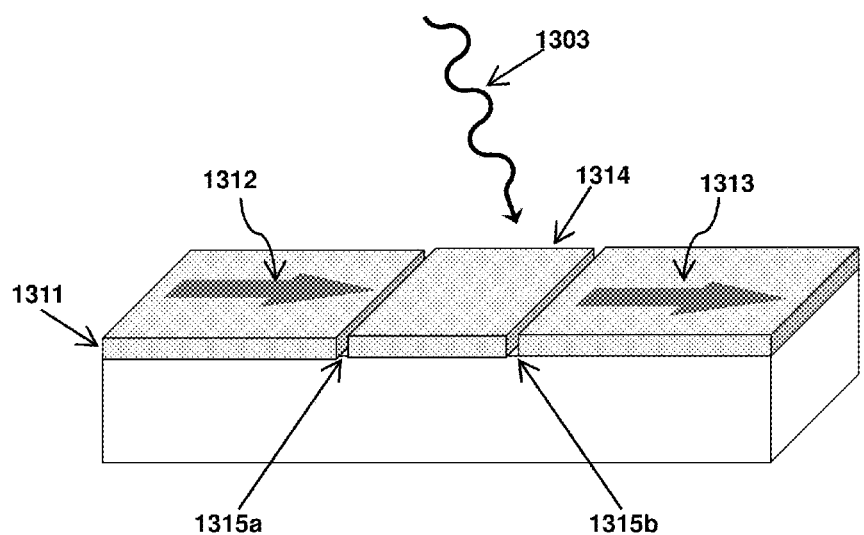
FIG. 13 is a block diagram illustrating aspects of another exemplary optically stimulated SPhP waveguide in accordance with the present invention.
Figure 14:
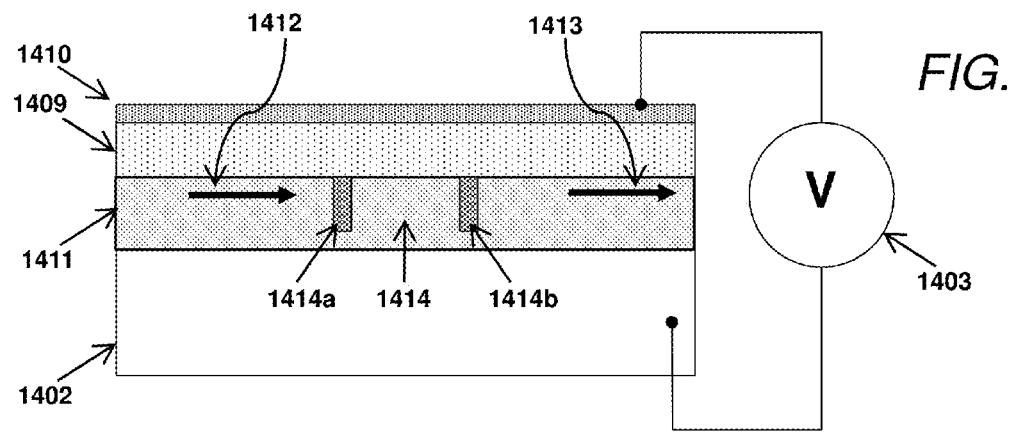
FIG. 14 is a block diagram illustrating aspects of another exemplary electrically stimulated SPhP waveguide in accordance with the present invention.

FIGS. 13 and 14 depict additional embodiments of an interferometrically based actively tunable polar-dielectric optical modulator in accordance with the present invention, in which modulation is achieved through the use of a Fabry-Perot cavity formed in the polar-dielectric material.

As illustrated in FIGS. 13 and 14, such modulators include an SPhP waveguide 1311/1411 having a Fabry-Perot cavity 1314/1414 formed by reflective features fabricated into the waveguide. The reflective features may assume many forms, such as gaps 1315a and 1315b as shown in FIG. 13, partial gaps 1414a and 1414b shown in FIG. 14, or ridges built up on a top surface of the waveguide through deposition of almost any material.

Transmission of the incident SPhP beam 1312/1412 traveling along the waveguide will not exit the Fabry-Perot cavity as beam 1313/1413 unless the wavelength of the SPhP beam is near a resonant wavelength of the cavity. The cavity transmission wavelength is strongly dependent on the refractive index of the material forming the cavity, which, as described above, in the case of polar-dielectrics, can be selectively controlled near the Reststrahlen wavelength band through the introduction of charge carriers into the cavity. Thus, in accordance with the present invention, in the embodiment illustrated in FIG. 13, the transmitted beam 1313 that results from the incident SPhP beam 1312 traveling through waveguide 1311 can be manipulated by controlling optical pump beam 1303 to alter the charge carrier density N and thus the resonant wavelength of the Fabry-Perot cavity 1314 in the waveguide. Similarly, in the embodiment illustrated in FIG. 14, the charge carrier density in the cavity 1414 can be electrically controlled in a manner described above through voltage source 1403 contacted to substrate 1402 and gate electrode 1410, which may optionally be separated from the waveguide 1411 by barrier layer 1409, depending on the electrical characteristics of the materials constituting substrate 1402, waveguide 1411, and gate electrode 1410.

The method of producing modulation by exploiting the sensitivity of the refractive index $n_r(N,\lambda)$ in polar-dielectrics to charge-carrier concentration in accordance with the present invention may also be used to effect beam steering on planar SPhP waveguides. Wavelength-sensitive steering can be used for subsequent wavelength-sensitive modulation, demodulation, or spectral analysis.

Figure 15:
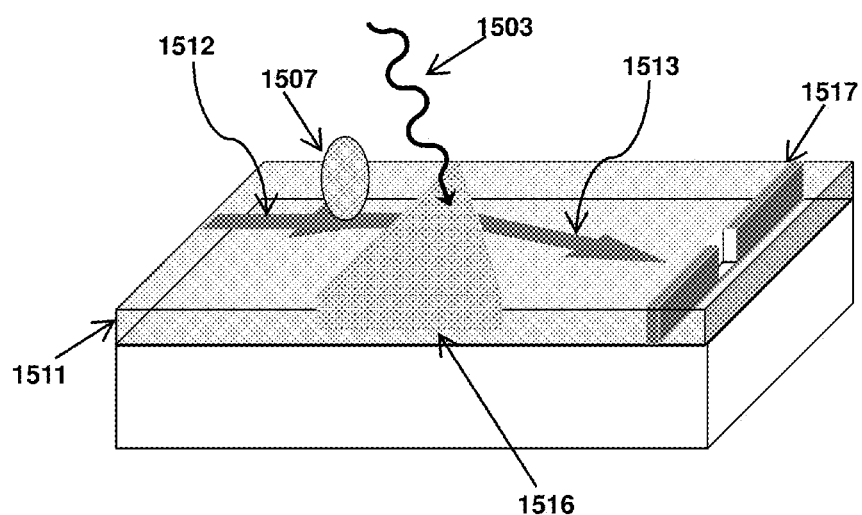
FIG. 15 is a block diagram illustrating aspects of an exemplary beam steerer configured for sensing that comprises an optically stimulated SPhP waveguide in accordance with the present invention.
Figure 16:
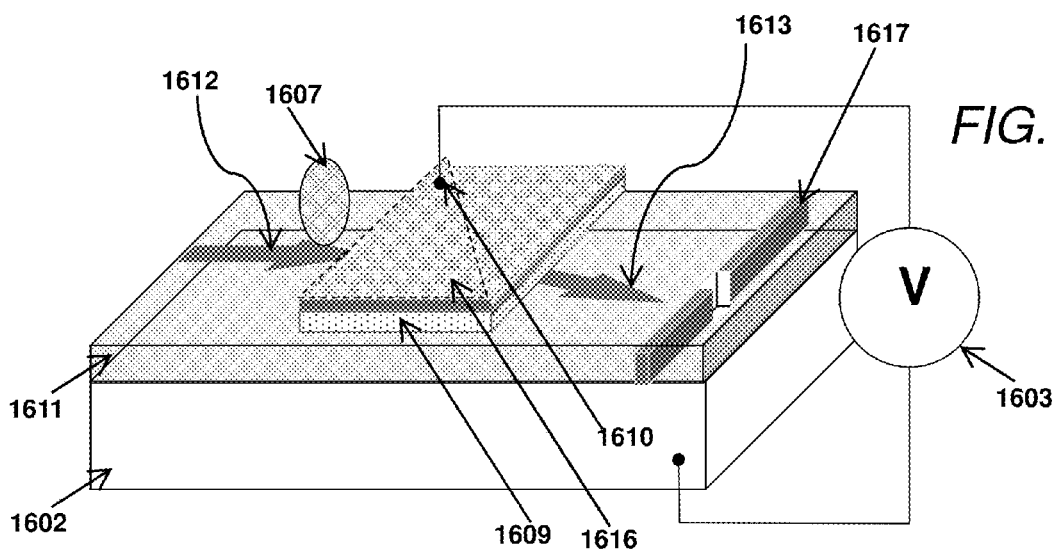
FIG. 16 is a block diagram illustrating aspects of an exemplary beam steerer configured for sensing that comprises an electrically stimulated SPhP waveguide in accordance with the present invention.

FIGS. 15 and 16 depict exemplary embodiments of such devices in accordance with the present invention that can steer an SPhP beam travelling along a waveguide. Steering occurs when incoming SPhP beam 1512/1612 travelling on a polar-dielectric waveguide 1511/1611 encounters an edge of the carrier pattern at some incident angle, and refracts as dictated by Snell's law. The angle of refraction depends on the refractive index $n_r(N,\lambda)$ of the waveguide, which can be controlled through the injection of charge carriers into the polar-dielectric material forming the waveguide.

Thus, in the devices illustrated in FIGS. 15 and 16, an incoming SPhP beam 1512/1612 traveling along a polar-dielectric waveguide 1511/1611 is refracted at the edges of a spatially patterned carrier distribution 1516/1616 formed in the waveguide to produce refracted outgoing beam 1513/1613.

In the optically pumped embodiment shown in FIG. 15, the pattern of carriers is produced through the use of optical pump beam 1503, which is shaped through a mask or through writing, transferring or otherwise fabricating the desired shape onto the waveguide 1511.

In addition, in the optically pumped embodiment illustrated in FIG. 15, the pattern of optically pumped carriers could form a diffraction grating operated in either transmission, reflection, or both. The pitch of the grating could be conveniently varied by varying the incident pump-light pattern 1503 to direct different SPhP wavelengths into desired locations on the chip.

In the electrically pumped embodiment shown in FIG. 16, carriers are pumped into the polar-dielectric material by means of voltage source 1603 contacted to substrate 1602 and gate electrode 1610, which optionally is separated from the polar-dielectric waveguide by barrier 1609. To eliminate refraction caused by the presence of the barrier and the electrode in the modal fields of the SPhP wave, only the portion of the electrode having the desired pattern is powered, e.g., a prism-shaped sub-element 1610a shown in FIG. 16.

In addition, although FIGS. 15 and 16 depict a prism-shaped carrier pattern which steers incoming beam 1512/1612 to produce steered outgoing beam 1513/1613, other carrier patterns could be designed so as to steer the beam in one or more desired directions depending on the desired function of the outgoing beam.

In addition, in some embodiments, various functions can be realized by placing a device or devices 1517/1617 downstream. For example, if outgoing beam 1513/1613 were a broad spectrum, an aperture located at some position along device 1517/1617 would pass only the wavelength that refracted at the proper angle, and the overall device would serve as a tuned source, with all the functionality that implies from the discussion above. To realize a wavelength modulator, the pump-beam intensity or the voltage would be modulated so that the wavelength of SPhP beams passing through the aperture would be modulated (or demodulated). On the other hand, if outgoing beam 1513/1613 were monochromatic, such an aperture would function as an intensity modulator or switch. The assembly 1517/1617 could also incorporate an optical detector to convert the SPhP power into electrical signals.

When equipped with wavelength-tunable elements, SPhP-waveguide devices in accordance with the present invention can serve as an integrated sensor of molecules adsorbed on a surface thereof.

For example, in the embodiments of FIGS. 15 and 16 described above, molecules 1507/1607 residing in the evanescent modal field of the SPhP beams would absorb power from the SPhPs at the wavelength $\lambda_{vib}$ associated with the molecules' characteristic vibrational frequencies. This absorption would then be detected by the detector assembly 1517/1617 as a dip in the received power when the system is tuned to direct $\lambda_{vib}$ at the detector.

An alternative sensing device that also employs propagating SPhP beams involves use of optical antennas fabricated on or into a SPhP waveguide. In such a device, the resonant properties of the antennas will improve sensitivity through surface-enhanced infrared absorption (SEIRA) as discussed above.

Figure 17:
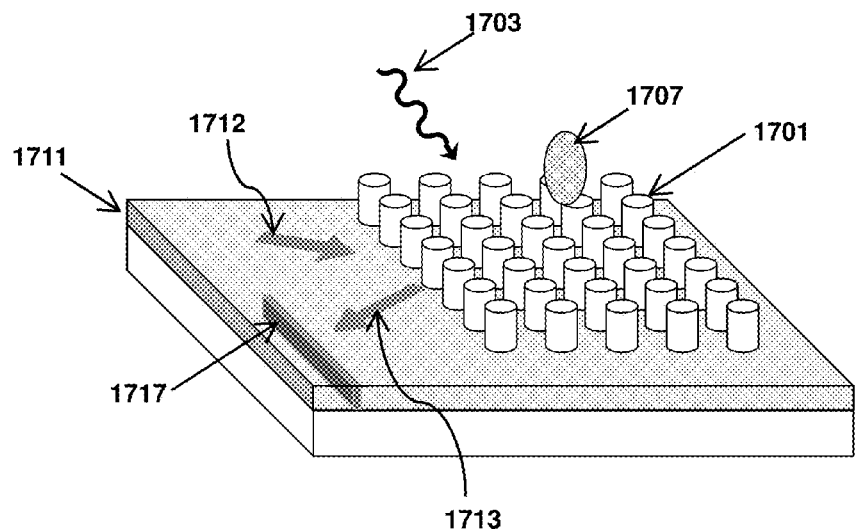
FIG. 17 is a block diagram illustrating aspects an exemplary sensor comprising an optically stimulated SPhP waveguide and SPhP antennas in accordance with the present invention.
Figure 18:
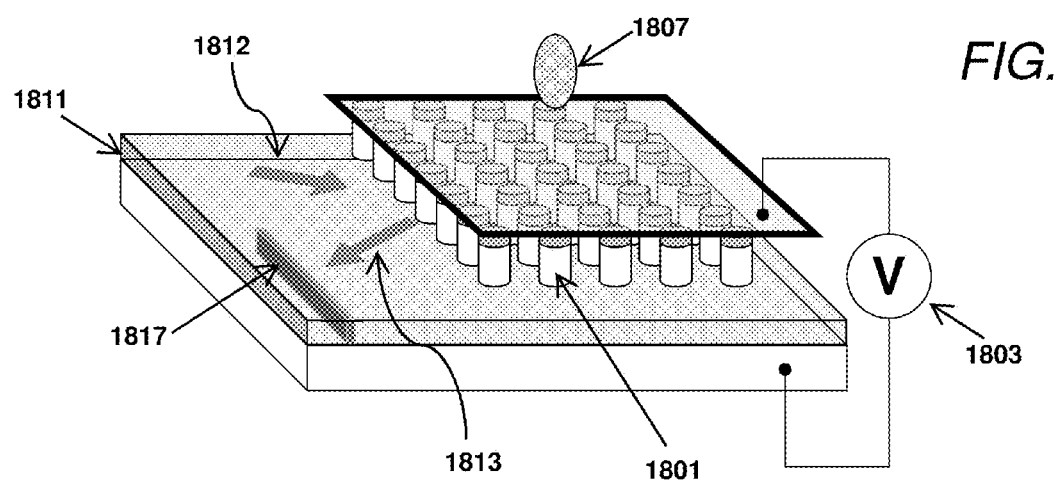
FIG. 18 is a block diagram illustrating aspects an exemplary sensor comprising an electrically stimulated SPhP waveguide and SPhP antennas in accordance with the present invention.

FIGS. 17 and 18 illustrate exemplary embodiments of such devices employing both an SPhP waveguide and optical antennas in accordance with the present invention. The embodiment illustrated in FIG. 17 is in the form of an integrated on-chip spectrometer tuned through $\lambda_{vib}$ by means of optically pumped tuning. The operation of this device is very similar to the embodiment shown in FIGS. 4A-4E described above, except that instead of the light beams 405 and 406 propagating through air as in that embodiment, in the embodiment illustrated in FIG. 17, there are SPhPs 1712 and 1713 travelling on waveguide 1711.

Thus, the devices illustrated in FIGS. 17 and 18 constitute integrated SEIRA sensors utilizing antenna arrays 1701/1801 disposed on an upper surface of SPhP waveguide 1711/1811 and detector assembly 1717/1817. An incident SPhP beam 1712/1812 travelling on waveguide 1711/1811 reflects from antenna array 1701/1801 to become SPhP beam 1713/1813 incident on detector assembly 1717/1818. The reflected spectrum of SPhP beam 1713/1813 will exhibit a strong peak at the resonance wavelength $\lambda_{res}$ of the antenna array which, as described above, can be tuned by altering the charge-carrier density N in the nanoantennas 1701/1801, either with the intensity of pump light-beam 1703 in the optically pumped embodiment shown in FIG. 17 or by the applied voltage from voltage source 1803 in the electrically pumped embodiment shown in FIG. 18, in a manner as described in the previous embodiments. The vibrational absorptions of adsorbed molecule 1707/1807 will cause reductions in the reflected intensity in the same manner as described above with respect to FIGS. 4A-4E and FIG. 6, with the reflected intensity being detected by detector assembly 1717/1817.

A variant of the SPhP waveguide is the so-called "epsilon near zero" (ENZ) waveguide. See, e.g., A. Alu and N. Engheta, "All optical metamaterial circuit board at the nanoscale," *Phys. Rev. Lett.* 2009, 103, 143902. Here, a low-index medium such as air ($\in_{1,air}(\lambda) \approx 1$) is surrounded by a medium with $\in_1(\lambda) \approx 0$. In this configuration, air is the optically denser material and will serve as a dielectric waveguide. A novel aspect of the waveguide is that in the absence of loss, energy propagates with a constant phase $\phi = kz$ of zero. Here z is distance, and k is the propagating-mode wavevector which, in the limit of no loss, is given by $k = \sqrt{\in_1} k_0$, where $k_0$ is the free-space wavevector $2\pi/\lambda$. Polar-dielectrics represent convenient ENZ materials in the infrared, as $\in_1(\lambda) \approx 0$ is at the longitudinal-optical-phonon wavelength, $\lambda_{LO}$.

Figure 19:
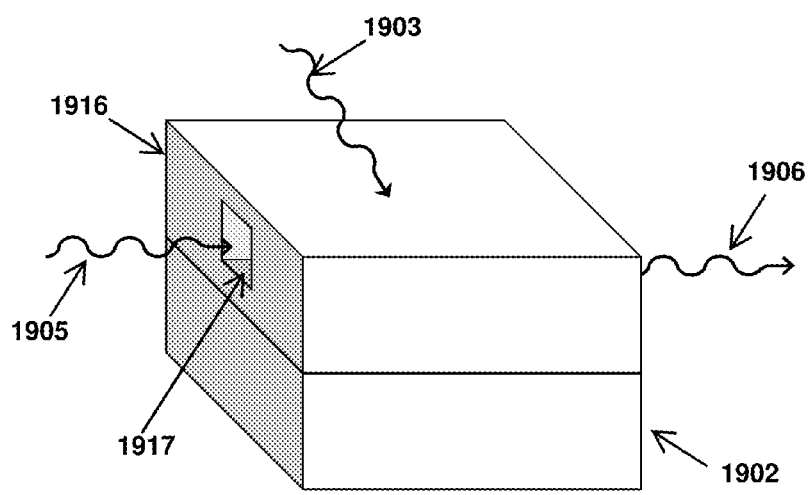
FIG. 19 is a block diagram illustrating aspects of an exemplary optically stimulated SPhP waveguide in accordance with one or more aspects of the present invention.
Figure 20:
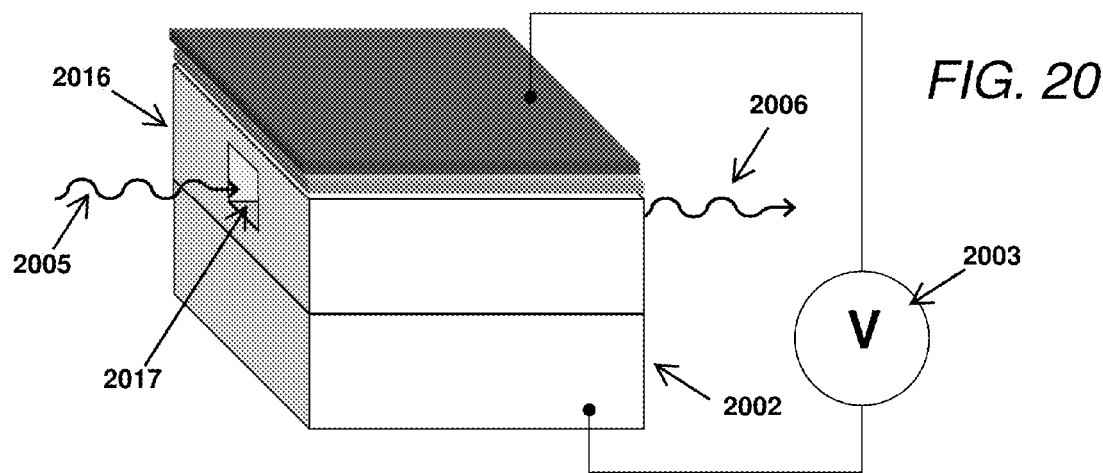
FIG. 20 is a block diagram illustrating aspects of an exemplary electrically stimulated SPhP waveguide in accordance with one or more aspects of the present invention.

Thus, as shown in FIGS. 19 and 20, in accordance with this embodiment of the present invention, such devices can be in the form of a polar-dielectric material 1916/2016 on a substrate 1902/2002. A channel or hollow tube 1917/2017 is fabricated within the polar-dielectric layer and serves as the waveguide. If the waveguide operates at a wavelength λ less than, but near to, $\lambda_{LO}$, its propagation characteristics will be especially sensitive to changes in carrier concentration (see the plot in FIG. 3A), and so controlling carrier concentration in the polar-dielectric material in accordance with the present invention can be expected to modulate the phase and amplitude of a beam transmitted through the waveguide formed in the material. For example, for large carrier densities, the hollow tube 1917/2017 would act as an IR waveguide below cut-off and block the propagation of an incident beam 1905/2005; decreasing the carrier density could bring $\in_1(\lambda) \approx 0$, and the beam 1905/2005 would be transmitted as beam 1905/2006. As with previously described devices, control of the device may be accomplished by adjusting carrier density in the polar-dielectric, either through optical pumping using pump beam 1903 or electrical charge injection by voltage source 2003.

Other embodiments of the devices described herein can be made, and such embodiments are within the scope and spirit of the present invention.

For example, in other embodiments, a device in accordance with the present invention can be configured with multiple SPhP materials, whereby a multifrequency structure can be created. As described in more detail below, in some such embodiments, charge carriers can be selectively injected into one or more of the materials, e.g., based on the various band gaps of the constituent materials, to controllably affect the resonant frequency $\lambda_{res}$ of SPhP nanoantennas or the phases of the interface polaritons $\lambda_{SPhP}$ between layers.

In some embodiments, at least one of the polar-dielectric materials can be in contact with a substrate; in such embodiments, the controllable electrical source is operatively connected to the substrate and the at least one polar-dielectric material and is configured to controllably inject charge carriers from the substrate into the at least one polar-dielectric material.

In other embodiments, at least one polar-dielectric material is in contact with a contact layer comprising a highly doped substrate, metallic film or a van der Waals (e.g., hexagonal boron nitride (hBN) or molybdenum disulfide ($MoS_2$)) film, where the controllable electrical source are operatively connected to both the contact layer and the at least one polar-dielectric material and are configured to controllably inject charge carriers from the contact layer into the at least one polar-dielectric material.

In still other embodiments, at least one of the polar-dielectric materials can be situated between an adjacent doped substrate on a first side thereof and a contact layer comprising one of a highly doped substrate, metallic film, or van de Waals film on the other side, where the charge carrier source is operatively connected to both the substrate and to the contact layer and is configured to controllably inject charge carriers of one polarity (electron or hole) from the substrate and of the opposite polarity from the contact layer into at the at least one polar-dielectric material.

FIGS. 21-25 illustrate various embodiments and aspects of such structures in accordance with the present invention. As shown in the FIGURES and as described in more detail below, in some embodiments, the multiple materials can be arranged to form a multi-layered structure in a stacked configuration where each successive layer covers only the top-facing surface of the previous one, while in other embodiments, the multiple materials can be arranged in a "conformally overgrown" layer configuration, where each successive material layer completely covers the previous layer.

In the case of the a stacked configuration, such a structure can be grown via epitaxial growth of thin films of gallium nitride, aluminum nitride and/or related ternary compounds (e.g. $Al_xGa_{1-x}N$) on silicon carbide or sapphire substrates. Such films may also be deposited by any other appropriate means such as sputtering, by ALD or by atomic layer epitaxy (ALE).

In the case of the conformally overgrown geometry, such structures can be grown via standard nanowire growth techniques, for instance the subsequent growth of AlGaN overlayers on GaN nanowires via the vapor-liquid solid method or through confined epitaxial growth. Of course other growth and/or fabrication methods resulting in similar and/or related structures can also be used. In some embodiments, all of the materials can be polar-dielectric materials that support SPhPs, while in other embodiments, only some of the materials will be SPhP materials, with the other materials being chosen for the electronic or optical properties (e.g. Si for simplified fabrication and/or high index of refraction).

In still other configurations, a SPhP structure can comprise multiple materials wherein one or more SPhP materials can be embedded within a host material, where the host material may or may not support SPhPs. For instance, GaN nanowires embedded in spin-on glass or SiC colloidal particles embedded within $Al_2O_3$ anodized templates.

FIGS. 21A-21C and 22A-22C illustrate these three exemplary configurations of an SPhP nanoantenna (FIGS. 21A-21C) and an SPhP waveguide (FIGS. 22A-22C) formed from multiple SPhP materials in accordance with some aspects of the present invention.

Figure 21A:
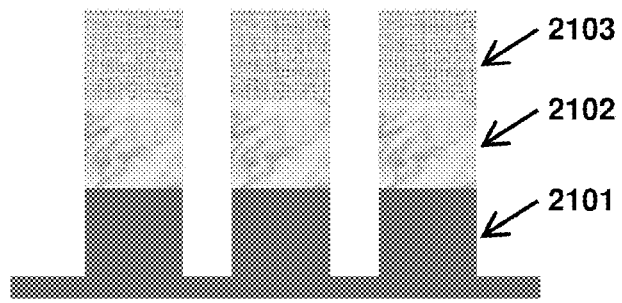
FIGS. 21A-21C are block diagrams illustrating exemplary embodiments of SPhP antennas formed from multiple SPhP materials in accordance with one or more aspects of the present invention.

Thus, FIGS. 21A/22A illustrates a nanoantenna/waveguide with multiple materials 2101/2201, 2102/2202, and 2103/2203 arranged in a stacked configuration, where each material is disposed only on the upper surface of the one below it.

While many potential embodiments can be envisioned, one potential structure could consist of three SPhP materials, each with a different bandgap, with the material with the largest gap on the top surface to enable sufficient transmission through this material to permit optical excitation of the underlying SPhP materials. Another such embodiment could be a quantum well type structure where a SPhP material is 'sandwiched' between two other SPhP or non-polar semiconductor materials with larger bandgaps whereby carrier injection into the middle material could be realized at high concentrations (e.g. AlGaAs/GaAs/AlGaAs).

Figure 21B:
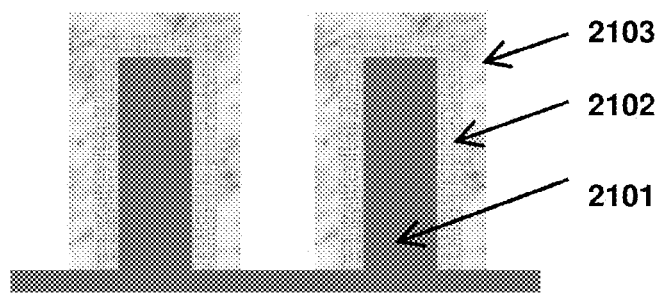
Figure 21C:
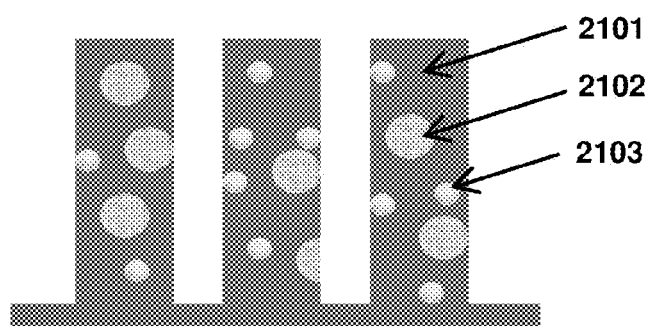
Figure 22A:
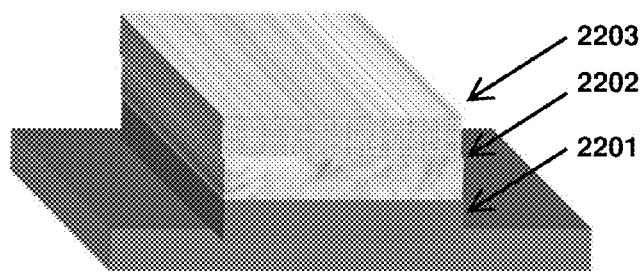
FIGS. 22A-22C are block diagrams illustrating exemplary embodiments of SPhP waveguides formed from multiple SPhP materials in accordance with one or more aspects of the present invention.
Figure 22B:
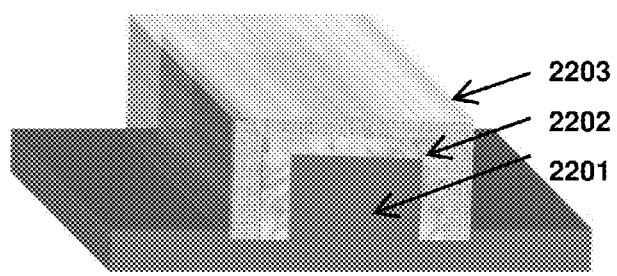
Figure 22C:
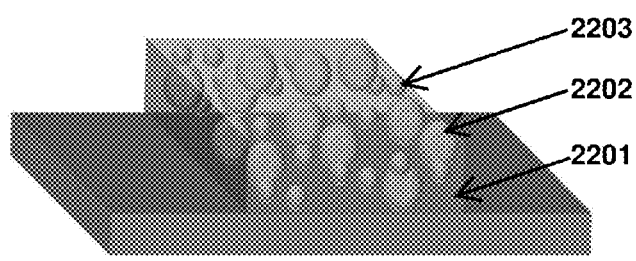

FIGS. 21B/22B illustrate a nanoantenna/waveguide in which materials 2101/2201, 2102/2202, and 2103/2203 are arranged in an overgrown configuration, where each successive layer of material completely surrounds the previous one, while FIGS. 21C/22C illustrate an exemplary embodiment of a nanoantenna/waveguide with particles of SPhP materials 2102/2202 and 2103/2203 embedded within host material 2101/2201.

Other embodiments may also be possible, for example, a layered or overgrown configuration where one layer includes embedded materials or a layered structure where one layer includes multiple materials in an overgrown configuration, and all such embodiments are deemed to be within the scope of the present invention.

By incorporating multiple SPhP materials, desired optical performance can be realized either through the choice of materials with a given index of refraction, one where the index of refraction can be changed over a large range through carrier injection, or materials can be chosen to have resonances in multiple frequency ranges.

For instance, in the case where materials are chosen to exhibit resonances in multiple frequency ranges, multiresonant SPhP antennas could be used to enhance sensitivity and selectivity for infrared absorption for molecular vibrational transitions through the surface enhanced infrared absorption (SEIRA) method. In such an embodiment, the resonant wavelengths of the antenna would be required to spectrally match those of molecular absorption bands due to vibrational transitions. Because these vibrational absorption bands can occur over a spectral range broader than the Reststrahlen band of a single SPhP material, use of multiple materials would enable SEIRA for multiple vibrational bands. Via the injection of carriers, these SPhP resonant modes could be further tuned to achieve SEIRA for several vibrational bands of the same molecule or to test for those associated with similar molecules that need to be excluded from the identification process to avoid false positive detection. By injecting carriers into one of two SPhP materials, tuning of the antenna resonance from the frequency for the vibrational absorption band of the molecule of interest to another could be established, while injecting carriers into two materials might be beneficial for detuning the antenna resonances from the vibrational absorption band of the molecule of interest to those of a similar molecule.

Figure 23C:
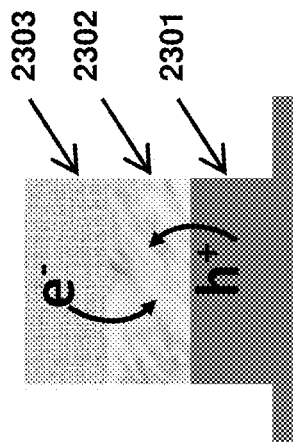
FIGS. 23A-23C are block diagrams illustrating exemplary carrier injection mechanisms in structures formed from multiple SPhP materials in accordance with one or more aspects of the present invention.
Figure 23B:
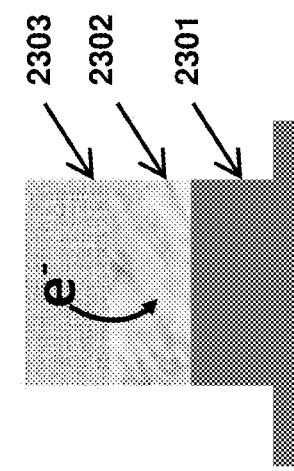
Figure 23A:
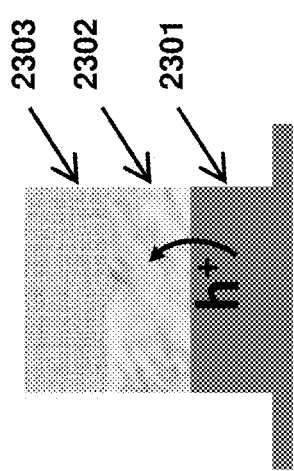

FIGS. 23A-23C illustrate three exemplary mechanisms by which a controllable electrical source can inject charge carriers into an SPhP nanoantenna having multiple layers of different SPhP materials as described above with respect to FIG. 21A. It should be noted that although FIGS. 23A-23C illustrate a nanoantenna having multiple materials in a layered structure, the principles described herein may be equally applicable to nanoantennas having multiple materials in the overgrown and embedded configurations described above and to waveguides in any of the possible multi-material configurations contemplated herein.

Thus, as shown in FIG. 23A, in one embodiment, charge carriers can be injected "bottom up", e.g., from a highly doped substrate or other bottom layer into a polar-dielectric layer via unipolar injection. In the embodiment illustrated in FIG. 23A, the injected charge carriers are holes (h+) but one skilled in the art will readily recognize that in other cases the injected charge carriers can be electrons (e−).

In another embodiment, illustrated in FIG. 23B, charge carriers can be injected from an upper layer such as a highly doped top layer, a metal contact layer, or a Schottky contact layer into a lower polar-dielectric layer; in such cases the unipolar injected charge carriers will be electrons (e−) and shown in FIG. 23B, though in other embodiments having an appropriately configured top layer, the "top down" injected carriers can be holes (h+).

In still another embodiment, illustrated in FIG. 23C, charge carriers can be injected into a polar-dielectric material from both the top and the bottom, with electrons being injected from one side and holes being injected from the other via bipolar injection.

FIGS. 24A-24D illustrate exemplary ways in which the resonant frequency $\lambda_{res}$ of a polar-dielectric nanoantenna formed from multiple materials can be tuned through the selective, controllable electrical or optical injection of charge carriers into one or more of the materials in accordance with the present invention. In the embodiments shown in FIGS. 24A-24D, the nanoantenna is formed from multiple materials, denoted as materials 2401, 2402, 2403, and 2404, in a layered structure. One skilled in the art, however, will readily recognize that the principles described herein may be used with antennas formed from multiple materials in the overgrown and embedded configurations described above.

Figure 24A:
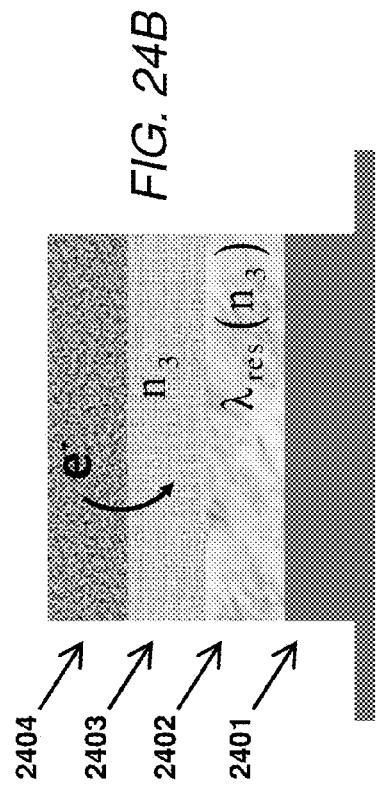
FIGS. 24A-24D are block diagrams illustrating exemplary methodologies for controlling the resonant frequency of an SPhP nanoantenna formed from multiple SPhP materials in accordance with one or more aspects of the present invention.

Thus, in a first embodiment, aspects of which are illustrated in FIG. 24A, the resonant frequency $\lambda_{res}(\in_2)$ of a polar-dielectric material 2402 can be directly modified through the electrical or optical injection of charge carriers into material 2402 from an adjacent layer 2403 or 2401, e.g., an injection of electrons e− from layer 2403 as shown in the FIGURE, wherein the injection of charge carriers modifies the permittivity $\in_2$ of material 2402. Alternatively, optical injection of charge carriers directly into material 2403 is possible.

Figure 24B:
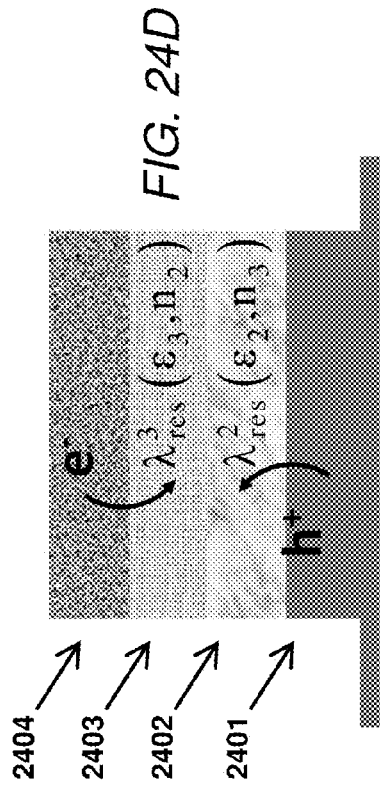

In a second embodiment, aspects of which are illustrated in FIG. 24B, carriers can be injected into an adjacent material (e.g., material layer 2403 as shown in the FIGURE) to modify the index of refraction $n_3$ of material 2403 and thereby modify the resonant frequency $\lambda_{res}(n_3)$ of layer 2402 as a function of the index of refraction $n_3$ of material layer 2403.

Figure 24C:
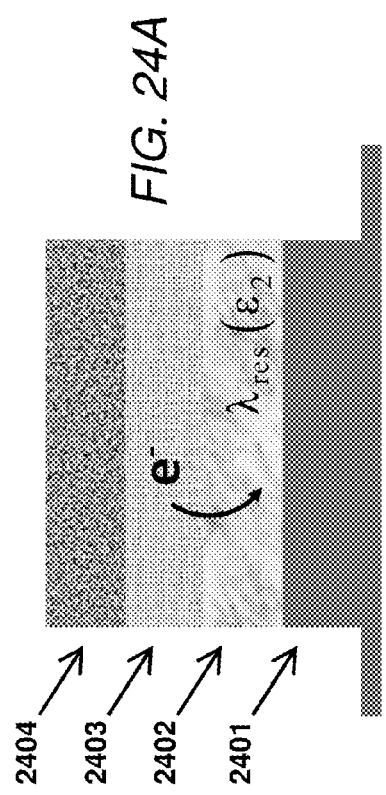

In a third embodiment, aspects of which are illustrated in FIG. 24C, carriers (e.g., holes (h+) as shown in the FIGURE) can be directly injected into material 2402 to change its permittivity $\in_2$ and carriers (e.g., electrons (e−) as shown in the FIGURE) can be directly injected into material 2403 to change its index of refraction $n_3$ such that the resonant frequency $\lambda_{res}(\in_2, n_3)$ of material 2402 is changed with the change in the permittivity $\in$ of the material 2042 and the index of refraction n of the adjacent material 2403.

Figure 24D:
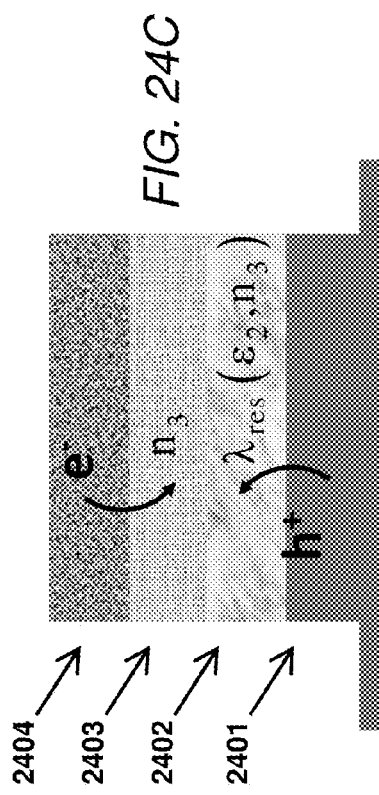

Finally, in a fourth embodiment, illustrated in FIG. 24D, both the permittivies $\in$ and the indices of refraction n of both material layers 2402 and 2403 can be changed through the injection of carriers thereinto, e.g., the injection of electrons (e−) into material layer 2403 and holes (h+) into material layer 2402, such that the resonant frequencies of both material layers are changed, with the resonant frequency of material layer 2402 being $\lambda_{res}^2(\in_2, n_3)$ and the resonant frequency of material layer 2403 being $\lambda_{res}^3(\in_3, n_2)$.

FIGS. 25A-25C illustrate exemplary ways in which the behavior of a wave traveling through a multi-material waveguide can be changed through the injection of charge carriers into one or more of the materials in accordance with the present invention. By selectively injecting charge carriers, either optically or electrically, one or more of the materials forming the waveguide, the wavelength $\lambda_{SPhP}$ of the interface polaritons between any two layers can be controllably changed so that they are in phase, out of phase, or at a harmonic.

Thus, as illustrated in FIGS. 25A-25C, charge carriers, e.g., electrons (e−) can be injected into material layer 2503 to cause the wavelength $\lambda_{SPhP}^{3,2}$ of the interface polaritons between material layers 2503 and 2502 to be in phase (FIG. 25A) with the wavelength $\lambda_{SPhP}^{2,1}$ of the interface polaritons between material layers 2042 and 2401, to be out of phase (FIG. 25B), or to be a harmonic, e.g., $\lambda_{SPhP}^{3,2} = 2\lambda_{SPhP}^{2,1}$ (FIG. 25C).

In still other embodiments, a device in accordance with the present invention can be in the form of a plurality of LSPhP resonators fabricated from a polar-dielectric material configured to thermally stimulate SPhPs that will in turn emit photons with a tailored spectrum and polarization dictated by the polar dielectric nanostructure when the material is raised to a higher temperature than its surroundings, e.g., by optical heating, resistive heating, conductive heating, radiative heating, etc. It has been shown previously that sub-wavelength structures of SPhP materials such as micron-diameter wires of SiC modify the black-body emission spectra of the material, providing distinct emission peaks which correspond to the specific LSPhP resonances, see J. S. Schuller, T. Taubner, and M. L. Brongersma, "Optical antenna thermal emitters," *Nature Photonics* 2009, 3, 658-661, and so by modifying the resonance position of these LSPhP modes, the thermal emission spectrum of the polar-dielectric material can be correspondingly modified. Thus, in another embodiment of the present invention, the thermal emission spectrum of such heated polar-dielectric materials can be tuned by injecting charge carriers directly into the material.

In still other embodiments, a device in accordance with the present invention can be fabricated from a metamaterial formed in whole or in part from SPhP materials such that the metamaterial exhibits SPhPs which affect the optical properties of the metamaterial when it is stimulated by an external stimulation such as heating, exposure of the metamaterial to an electron beam, or exposure of the metamaterial to an infrared optical beam having at least one wavelength within a Reststrahlen band of at least one of the polar-dielectric materials. As with the case of other embodiments described above, a value of at least one optical property of such a metamaterial is dependent on the concentration of charge carriers in the material, and thus, in accordance with the present invention can be tuned by the controllable injection of charge carriers into the material. In these embodiments in accordance with the present invention, the effective index of refraction of an SPhP-based metamaterial, which in some cases can be negative, can be modified via carrier injection such that the output angle of the refracted light can be modulated through the optical pump power or the electrostatic gate voltage. This concept could also be applied to modify the corresponding ordinary (e.g., in-plane) and extraordinary (e.g., out-of-plane) permittivities of the anisotropic lattice of a polar-dielectric material or of an anisotropic structure. It can also be used to modify the birefringence (i.e. different indices of refraction for orthogonal crystal axes; e.g. 4H—SiC, wurtzite GaN) or hyperbolic (i.e. simultaneous positive and negative real permittivities from orthogonal crystal axes, e.g., as in hBN or $MoS_2$) properties of SPhP materials, metamaterials, or other device designs.

ADVANTAGES AND NEW FEATURES

The present invention provides many important advantages over the prior art.

As noted above, an important advantage of employing LSPhP resonant antennas is the ability to control the resonant wavelength by virtue of carriers injected directly into the antenna, a virtual impossibility for plasmonic systems.

This provides a significant improvement over prior art methods in which coarse tuning was achieved by preselecting the shape of the antennas, using a well-known phenomenon for such sub-wavelength dipole resonators. See S. Link and M. A. El-Sayed, "Shape and size dependence of radiative, non-radiative and photothermal properties of gold nanocrystals," *Intl. Reviews Phys. Chem.*, 2000, 19, 409-453; see also Bukasov, supra.

Another key difference between plasmonic and SPhP antennas is the much lower loss that can be exhibited by phonon polaritonic materials. A telling comparison occurs at wavelengths within the 8-12 μm atmospheric transmission window of great importance to both Department of Defense (DoD) and commercial sectors. This wavelength range is also of use for identifying a host of molecules through absorptions at their characteristic vibrational frequencies, since many chemical species exhibit vibrational modes within this spectral range. Among the materials that possess the necessary Reststrahlen band in this wavelength range are SiC, GaN, BN, BC, AlN, $Al_2O_3$, and $SiO_2$ and ternary compounds such as AlGaN, though any other appropriate materials may also be used. Computations based on phonon lifetimes show that the quality factor Q for LSPhP resonators can exceed 500 in SiC, whereas for antennas made of the lowest loss metals in the same wavelength range, Q factors are less than 10.

The large values of Q enable entirely new capabilities, for example in vibrational-based sensing applications described herein. For example, spectral width of an SPhP antenna resonance can be as narrow as a few wavenumbers ($cm^{-1}$), similar to the vibrational linewidths of molecules in the condensed-phase. This would enable the selective enhancement of single vibrational modes of a given molecule, thus enabling levels of spectral specificity to the SEIRA effect that are impossible with plasmonic-based methods. The narrow bandwidth associated with the high Q transmission or reflectance peaks described above also offers a new source of tunable radiation having a large tuning range exceeding present sources.

The ability to produce nanoscale low loss resonators also leads to the ability to produce very large resonant optical fields that will improve sensitivity for molecular sensing.

Although particular embodiments, aspects, and features have been described and illustrated, it should be noted that the invention described herein is not limited to only those embodiments, aspects, and features, and it should be readily appreciated that modifications may be made by persons skilled in the art. The present application contemplates any and all modifications within the spirit and scope of the underlying invention described and claimed herein, and all such embodiments are within the scope and spirit of the present disclosure.

What is claimed is:

1. An actively tunable polar-dielectric optical device, comprising:

a plurality of polar-dielectric SPhP nanoantennas fabricated from a plurality of polar-dielectric materials, a first portion of each nanoantenna being fabricated from a first polar-dielectric material and a second portion of each nanoantenna being fabricated from a second polar-dielectric material, each of the first and second polar-dielectric materials being configured to exhibit surface phonon polaritons (SPhPs) when it is exposed to a corresponding incident infrared optical beam having at least one wavelength within a Reststrahlen band of that polar-dielectric material, a presence of SPhPs in each of the polar-dielectric materials affecting at least one optical property of the device, a value of the at least one optical property of the structure being dependent on a concentration of charge carriers in the polar-dielectric materials; and a controllable source of charge carriers configured to inject additional charge carriers into at least one of the polar-dielectric materials;

wherein the at least one optical property is a resonant wavelength $\lambda_{res}$ in the first polar-dielectric material;

wherein a first injection of charge carriers into the first polar-dielectric material is configured to produce a desired permittivity $\epsilon_1$ in the first polar-dielectric material; and wherein a second injection of charge carriers into the second polar-dielectric material is configured to produce a desired index of refraction $n_2$ in the second polar-dielectric material; and wherein the first and second injections of charge carriers are further configured to produce a desired resonant wavelength $\lambda_{res}(\in_1, n_2)$ in the first polar-dielectric material.

2. The actively tunable polar-dielectric optical device according to claim 1;
wherein the plurality of polar-dielectric SPhP nanoantennas are fabricated from a plurality of polar-dielectric materials in a stacked structure.

3. The actively tunable polar-dielectric optical device according to claim 1;
wherein the plurality of polar-dielectric SPhP nanoantennas are fabricated from a plurality of polar-dielectric materials configured as a plurality of discrete conformally overgrown layers.

4. The actively tunable polar-dielectric optical device according to claim 1;
wherein the plurality of polar-dielectric SPhP nanoantennas are fabricated from a plurality of polar-dielectric materials wherein the second polar-dielectric material is embedded within a structure formed from the first polar-dielectric material.

5. The actively tunable polar-dielectric optical device according to claim 1;
wherein the charge carrier source is a controllable optical pump beam incident on the structure; and
wherein the injection of charge carriers into the at least one the polar-dielectric materials is controlled by controlling an intensity of the pump beam incident on that polar-dielectric material.

6. The actively tunable polar-dielectric optical device according to claim 1;
wherein at least one of the polar-dielectric materials is situated adjacent to one of a doped substrate, a metallic film, and a van der Waals film, and wherein the charge carrier source is a controllable electrical source operatively connected to the at least one polar-dielectric material and to the one of the substrate, the metallic film, and the van der Waals film, the controllable electrical source being configured to controllably inject charge carriers from the substrate, the metallic film, or the van der Waals film into at the at least one polar-dielectric material;
wherein the injection of charge carriers into the at least one polar-dielectric materials is controlled by controlling an electrical signal from the electrical source.

7. The actively tunable polar-dielectric optical device according to claim 1;
wherein at least one of the polar-dielectric materials is situated between a first substrate and a contact layer comprising one of a second substrate, a metallic film or a van der Waals film and wherein the charge carrier source is a controllable electrical source operatively connected to the substrate and the contact layer, the controllable electrical source being configured to controllably inject charge carriers of one polarity (electron or hole) from the substrate and of the opposite polarity from the contact layer into at the at least one polar-dielectric material;
wherein the injection of charge carriers into the at least one polar-dielectric materials is controlled by controlling an electrical signal from the electrical source.

8. The actively tunable polar-dielectric optical device according to claim 1, wherein at least one of the polar-dielectric materials comprises SiC, GaN, BN, BC, AN, $Al_2O_3$, $SiO_2$, or AlGaN.

9. The actively tunable polar-dielectric optical device according to claim 1,
wherein at least one of a corresponding extraordinary and a corresponding ordinary permittivity of at least one of the polar-dielectric materials is actively tuned by controlling the number of charge carriers injected into the device.

10. The actively tunable polar-dielectric optical device according to claim 1, wherein a birefringence of at least one of the polar-dielectric materials is actively tuned by controlling the number of charge carriers injected into the device.

11. An actively tunable polar-dielectric optical device, comprising:
a plurality of polar-dielectric SPhP nanoantennas fabricated from a plurality of polar-dielectric materials, a first portion of each nanoantenna being fabricated from a first polar-dielectric material and a second portion of each nanoantenna being fabricated from a second polar-dielectric material, each of the first and second polar-dielectric materials being configured to exhibit surface phonon polaritons (SPhPs) when it is exposed to a corresponding incident infrared optical beam having at least one wavelength within a Reststrahlen band of that polar-dielectric material, a presence of SPhPs in each of the polar-dielectric materials affecting at least one optical property of the device, a value of the at least one optical property of the structure being dependent on a concentration of charge carriers in the polar-dielectric materials; and
a controllable source of charge carriers configured to inject additional charge carriers into at least one of the polar-dielectric materials;
wherein a first injection of charge carriers into the first polar-dielectric material is configured to produce a desired permittivity $\in_1$ and a desired index of refraction $n_1$ in the first polar-dielectric material; and
wherein a second injection of charge carriers into the second polar-dielectric material is configured to produce a desired permittivity $\in_2$ and desired index of refraction $n_2$ in the second polar-dielectric material; and
wherein the first and second injections of charge carriers are further configured to produce a desired first resonant wavelength $\lambda_{res}(\in_1, n_2)$ in the first polar-dielectric material and a desired second resonant wavelength $\lambda_{rTes}(\in_1, n_1)$ in the second polar-dielectric material.

12. The actively tunable polar-dielectric optical device according to claim 11;
wherein the plurality of polar-dielectric SPhP nanoantennas are fabricated from a plurality of polar-dielectric materials in a stacked structure.

13. The actively tunable polar-dielectric optical device according to claim 11;
wherein the plurality of polar-dielectric SPhP nanoantennas are fabricated from a plurality of polar-dielectric materials configured as a plurality of discrete conformally overgrown layers.

14. The actively tunable polar-dielectric optical device according to claim 11;
wherein the plurality of polar-dielectric SPhP nanoantennas are fabricated from a plurality of polar-dielectric materials wherein the second polar-dielectric material is embedded within a structure formed from the first polar-dielectric material.

15. The actively tunable polar-dielectric optical device according to claim 11;
wherein the charge carrier source is a controllable optical pump beam incident on the structure; and wherein the injection of charge carriers into the at least one the polar-dielectric materials is controlled by controlling an intensity of the pump beam incident on that polar-dielectric material.

16. The actively tunable polar-dielectric optical device according to claim 11;
wherein at least one of the polar-dielectric materials is situated adjacent to one of a doped substrate, a metallic film, and a van der Waals film, and wherein the charge carrier source is a controllable electrical source operatively connected to the at least one polar-dielectric material and to the one of the substrate, the metallic film, and the van der Waals film, the controllable electrical source being configured to controllably inject charge carriers from the substrate, the metallic film, or the van der Waals film into at the at least one polar-dielectric material;
wherein the injection of charge carriers into the at least one polar-dielectric materials is controlled by controlling an electrical signal from the electrical source.

17. The actively tunable polar-dielectric optical device according to claim 11;
wherein at least one of the polar-dielectric materials is situated between a first substrate and a contact layer comprising one of a second substrate, a metallic film or a van der Waals film and wherein the charge carrier source is a controllable electrical source operatively connected to the substrate and the contact layer, the controllable electrical source being configured to controllably inject charge carriers of one polarity (electron or hole) from the substrate and of the opposite polarity from the contact layer into at the at least one polar-dielectric material;
wherein the injection of charge carriers into the at least one polar-dielectric materials is controlled by controlling an electrical signal from the electrical source.

18. The actively tunable polar-dielectric optical device according to claim 11, wherein at least one of the polar-dielectric materials comprises SiC, GaN, BN, BC, AlN, $Al_2O_3$, $SiO_2$, or AlGaN.

19. The actively tunable polar-dielectric optical device according to claim 11, wherein at least one of a corresponding extraordinary and a corresponding ordinary permittivity of at least one of the polar-dielectric materials is actively tuned by controlling the number of charge carriers injected into the device.

20. The actively tunable polar-dielectric optical device according to claim 11, wherein a birefringence of at least one of the polar-dielectric materials is actively tuned by controlling the number of charge carriers injected into the device.

21. An actively tunable polar-dielectric optical device, comprising:
an SPhP waveguide fabricated from a plurality of polar-dielectric materials, a first portion of the waveguide being fabricated from a first polar-dielectric material and a second portion of the waveguide being fabricated from a second polar-dielectric material, each of the first and second polar-dielectric materials being configured to exhibit surface phonon polaritons (SPhPs) when it is exposed to a corresponding incident infrared optical beam having at least one wavelength within a Reststrahlen band of that polar-dielectric material, a presence of SPhPs in each of the polar-dielectric materials affecting at least one optical property of the device, a value of the at least one optical property of the structure being dependent on a concentration of charge carriers in the polar-dielectric materials; and
a controllable source of charge carriers configured to inject additional charge carriers into at least one of the polar-dielectric materials;
wherein the at least one optical property is an index of refraction $n_r$ of the waveguide;
wherein the index of refraction $n_r$ is actively tuned by controllably injecting a first plurality of charge carriers into the first polar-dielectric material and controllably injecting a second plurality of charge carriers into the second polar-dielectric material.

22. The actively tunable polar-dielectric optical device according to claim 21; wherein the SPhP waveguide is fabricated from a plurality of polar-dielectric materials in a stacked structure.

23. The actively tunable polar-dielectric optical device according to claim 21; wherein the SPhP waveguide is fabricated from a plurality of polar-dielectric materials configured as a plurality of discrete conformally overgrown layers.

24. The actively tunable polar-dielectric optical device according to claim 21; wherein the SPhP waveguide is fabricated from a plurality of polar-dielectric materials wherein the second polar-dielectric material is embedded within a structure formed from the first polar-dielectric material.

25. The actively tunable polar-dielectric optical device according to claim 21; wherein the charge carrier source is a controllable optical pump beam incident on the structure; and wherein the injection of charge carriers into the at least one the polar-dielectric materials is controlled by controlling an intensity of the pump beam incident on that polar-dielectric material.

26. The actively tunable polar-dielectric optical device according to claim 21; wherein at least one of the polar-dielectric materials is situated adjacent to one of a doped substrate, a metallic film, and a van der Waals film, and wherein the charge carrier source is a controllable electrical source operatively connected to the at least one polar-dielectric material and to the one of the substrate, the metallic film, and the van der Waals film, the controllable electrical source being configured to controllably inject charge carriers from the substrate, the metallic film, or the van der Waals film into at the at least one polar-dielectric material; wherein the injection of charge carriers into the at least one polar-dielectric materials is controlled by controlling an electrical signal from the electrical source.

27. The actively tunable polar-dielectric optical device according to claim 21; wherein at least one of the polar-dielectric materials is situated between a first substrate and a contact layer comprising one of a second substrate, a metallic film or a van der Waals film and wherein the charge carrier source is a controllable electrical source operatively connected to the substrate and the contact layer, the controllable electrical source being configured to controllably inject charge carriers of one polarity (electron or hole) from the substrate and of the opposite polarity from the contact layer into at the at least one polar-dielectric material; wherein the injection of charge carriers into the at least one polar-dielectric materials is controlled by controlling an electrical signal from the electrical source.

28. The actively tunable polar-dielectric optical device according to claim 21, wherein at least one of the polar-dielectric materials comprises SiC, GaN, BN, BC, AlN, $Al_2O_3$, $SiO_2$, or AlGaN.

29. The actively tunable polar-dielectric optical device according to claim 21, wherein at least one of a corresponding extraordinary and a corresponding ordinary permittivity of at least one of the polar-dielectric materials is actively tuned by controlling the number of charge carriers injected into the device.

30. The actively tunable polar-dielectric optical device according to claim 21, wherein a birefringence of at least one of the polar-dielectric materials is actively tuned by controlling the number of charge carriers injected into the device.

\* \* \* \* \*